US012322403B2

(12) United States Patent
Liang

(10) Patent No.: US 12,322,403 B2
(45) Date of Patent: Jun. 3, 2025

(54) SPEECH CODING METHOD AND APPARATUS, COMPUTER DEVICE, AND STORAGE MEDIUM

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 481 days.

(21) Appl. No.: 17/740,309

(22) Filed: May 9, 2022

(65) Prior Publication Data

US 2022/0270622 A1 Aug. 25, 2022

Related U.S. Application Data

(63) Continuation of application No. PCT/CN2021/095714, filed on May 25, 2021.

(30) Foreign Application Priority Data

Jun. 24, 2020 (CN) ......................... 202010585545.9

(51) Int. Cl.

*G10L 19/02* (2013.01)
*G10L 25/78* (2013.01)

(Continued)

(52) U.S. Cl.

CPC .............. *G10L 19/02* (2013.01); *G10L 25/78* (2013.01); *G10L 25/90* (2013.01); *G10L 25/93* (2013.01)

(58) Field of Classification Search

CPC ......... G10L 19/02; G10L 25/78; G10L 25/90; G10L 25/93; G10L 19/025; G10L 19/22; G10L 19/24; G10L 19/00

(Continued)

(56) References Cited

U.S. PATENT DOCUMENTS 5,911,128 A * 6/1999 DeJaco .................... G10L 19/18 704/214
6,278,735 B1 * 8/2001 Mohsenian ............ H04N 19/51 375/E7.157

(Continued)

FOREIGN PATENT DOCUMENTS

CN 1976479 A 6/2007
CN 101395671 A 3/2009

(Continued)

OTHER PUBLICATIONS

Tencent Technology, Extended European Search Report and Supplementary Search Report, EP20770930.4, Apr. 11, 2022, 11 pgs.

(Continued)

*Primary Examiner* — Thierry L Pham
(74) *Attorney, Agent, or Firm* — Morgan, Lewis & Bockius LLP

(57) ABSTRACT

This application relates to a speech coding method, an electronic device, and a storage medium. The method includes: extracting a first speech frame feature corresponding to a first to-be-encoded speech frame, and obtaining a first speech frame criticality level corresponding to the first to-be-encoded speech frame based on the first speech frame feature; extracting a second speech frame feature corresponding to the subsequent speech frame, and obtaining a second speech frame criticality level corresponding to the subsequent speech frame based on the second speech frame feature; obtaining a criticality trend feature based on the first speech frame criticality level and the second speech frame criticality level, and determining, using the criticality trend feature, an encoding bit rate corresponding to the to-be-encoded speech frame; and encoding the first to-be-encoded speech frame based on the encoding bit rate to obtain an encoding result.

20 Claims, 9 Drawing Sheets

(51) Int. Cl.
*G10L 25/90* (2013.01)
*G10L 25/93* (2013.01)

(58) Field of Classification Search
USPC .......................................................... 704/500
See application file for complete search history.

(56) References Cited

U.S. PATENT DOCUMENTS

| | | | | |
|---|---|---|---|---|
| 2007/0168186 | A1 | 7/2007 | Ide | |
| 2009/0319261 | A1* | 12/2009 | Gupta | G10L 19/20 704/E21.001 |
| 2013/0185062 | A1* | 7/2013 | Krishnan | H04L 1/007 704/219 |
| 2014/0119432 | A1* | 5/2014 | Wang | H04N 19/177 375/240.2 |
| 2014/0303968 | A1 | 10/2014 | Ward et al. | |
| 2018/0316923 | A1* | 11/2018 | Stachurski | H04N 19/15 |
| 2020/0029081 | A1 | 1/2020 | Good | |
| 2023/0133252 | A1* | 5/2023 | Gao | G10L 19/002 704/500 |

FOREIGN PATENT DOCUMENTS

| | | | |
|---|---|---|---|
| CN | 101847412 | A | 9/2010 |
| CN | 102543090 | A | 7/2012 |
| CN | 103050122 | A | 4/2013 |
| CN | 103338375 | A | 10/2013 |
| CN | 103841418 | A | 6/2014 |
| CN | 104517612 | A | 4/2015 |
| CN | 106534862 | A | 3/2017 |
| CN | 109151470 | A | 1/2019 |
| CN | 109729353 | A | 5/2019 |
| CN | 110166780 | A | 8/2019 |
| CN | 110166781 | A | 8/2019 |
| CN | 110740334 | A | 1/2020 |
| CN | 110890945 | A | 3/2020 |
| CN | 112767953 | A | 5/2021 |
| CN | 112767955 | A | 5/2021 |
| EP | 1107231 | A3 | 5/2001 |
| EP | 1107231 | A2 | 6/2001 |
| EP | 2803065 | B1 | 1/2017 |
| JP | H 05175941 | A | 7/1993 |
| JP | 2011007870 | A | 1/2011 |
| JP | 2014531064 | A | 11/2014 |

OTHER PUBLICATIONS

Tencent Technology, Indian Office Action, IN Patent Application No. 202247026438, Feb. 10, 2023, 6 pgs.

Tencent Technology, ISR, PCT/CN2021/095714, Sep. 1, 2021, 3 pgs.

Tencent Technology, WO, PCT/CN2021/095714, Aug. 11, 2021, 4 pgs.

Tencent Technology, IPRP, PCT/CN2021/095714, Dec. 13, 2022, 5 pgs.

* cited by examiner

SPEECH CODING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/095714, entitled "SPEECH ENCODING METHOD AND APPARATUS, COMPUTER DEVICE, AND STORAGE MEDIUM" filed on May 25, 2021, which claims priority to Chinese Patent Application No. 202010585545.9, filed with the State Intellectual Property Office of the People's Republic of China on Jun. 24, 2020, and entitled "SPEECH CODING METHOD AND APPARATUS, COMPUTER DEVICE, AND STORAGE MEDIUM", all of which are incorporated herein by reference in their entirety.

FIELD OF THE TECHNOLOGY

This application relates to the field of Internet technology, and in particular, to a speech coding method and apparatus, a computer device, and a storage medium.

BACKGROUND OF THE DISCLOSURE

With the development of communications technology, speech coding and decoding are very important in a modern communications system. Currently, in a non-real-time speech coding and decoding application scenario, such as conference recording and audio broadcasting, a bit rate parameter of speech coding is usually preset. During encoding, the preset bit rate parameter is used for speech coding. However, the current speech coding performed by using the preset bit rate parameter may include redundant coding, resulting in a problem of low coding quality.

SUMMARY

According to various embodiments of this application, a speech coding method and apparatus, a computer device, and a storage medium are provided.

A speech coding method, executed by a computer device, the method including:

- obtaining a first to-be-encoded speech frame and a subsequent speech frame;
- extracting a first speech frame feature corresponding to the first to-be-encoded speech frame, and obtaining a first speech frame criticality level corresponding to the first to-be-encoded speech frame based on the first speech frame feature;
- extracting a second speech frame feature corresponding to the subsequent speech frame, and obtaining a second speech frame criticality level corresponding to the subsequent speech frame based on the second speech frame feature;
- obtaining a criticality trend feature based on the first speech frame criticality level and the second speech frame criticality level, and determining, by using the criticality trend feature, an encoding bit rate corresponding to the first to-be-encoded speech frame; and
- encoding the first to-be-encoded speech frame based on the encoding bit rate to obtain an encoding result.

In an embodiment, the encoding the to-be-encoded speech frame based on the encoding bit rate to obtain an encoding result includes:

- transmitting the encoding bit rate to a standard encoder through an interface to obtain an encoding result, the standard encoder being configured to encode the to-be-encoded speech frame by using the encoding bit rate.

A speech coding apparatus, the apparatus including:

- a speech frame obtaining module, configured to obtain a to-be-encoded speech frame and a subsequent speech frame corresponding to the to-be-encoded speech frame;
- a first criticality calculation module, configured to extract at least one to-be-encoded speech frame feature corresponding to the to-be-encoded speech frame, and calculate a to-be-encoded speech frame criticality level corresponding to the to-be-encoded speech frame based on the to-be-encoded speech frame feature;
- a second criticality calculation module, configured to extract a subsequent speech frame feature corresponding to the subsequent speech frame, and calculate a subsequent speech frame criticality level corresponding to the subsequent speech frame based on the subsequent speech frame feature;
- a bit rate calculation module, configured to obtain a criticality trend feature based on the to-be-encoded speech frame criticality level and the subsequent speech frame criticality level, and determine, by using the criticality trend feature, an encoding bit rate corresponding to the to-be-encoded speech frame; and
- an encoding module, configured to encode the to-be-encoded speech frame based on the encoding bit rate to obtain an encoding result.

A computer device, including a memory and a processor, where the memory stores a computer-readable instruction; when executed by the processor, the computer-readable instruction causes the processor to perform the following steps:

- obtaining a to-be-encoded speech frame and a subsequent speech frame corresponding to the to-be-encoded speech frame;
- extracting at least one to-be-encoded speech frame feature corresponding to the to-be-encoded speech frame, and obtaining a to-be-encoded speech frame criticality level corresponding to the to-be-encoded speech frame based on the to-be-encoded speech frame feature;
- extracting a subsequent speech frame feature corresponding to the subsequent speech frame, and obtaining a subsequent speech frame criticality level corresponding to the subsequent speech frame based on the subsequent speech frame feature;
- obtaining a criticality trend feature based on the to-be-encoded speech frame criticality level and the subsequent speech frame criticality level, and determining, by using the criticality trend feature, an encoding bit rate corresponding to the to-be-encoded speech frame, and
- encoding the to-be-encoded speech frame based on the encoding bit rate to obtain an encoding result.

One or more non-volatile storage medium that stores a computer-readable instruction, where when executed by one or more processors, the computer-readable instruction causes the one or more processors to perform the following steps:

- obtaining a to-be-encoded speech frame and a subsequent speech frame corresponding to the to-be-encoded speech frame;
- extracting at least one to-be-encoded speech frame feature corresponding to the to-be-encoded speech frame, and obtaining a to-be-encoded speech frame criticality level corresponding to the to-be-encoded speech frame based on the to-be-encoded speech frame feature;

extracting a subsequent speech frame feature corresponding to the subsequent speech frame, and obtaining a subsequent speech frame criticality level corresponding to the subsequent speech frame based on the subsequent speech frame feature;

obtaining a criticality trend feature based on the to-be-encoded speech frame criticality level and the subsequent speech frame criticality level, and determining, by using the criticality trend feature, an encoding bit rate corresponding to the to-be-encoded speech frame; and encoding the to-be-encoded speech frame based on the encoding bit rate to obtain an encoding result.

The details of one or more embodiments of this application are set forth in the drawings and description below. Other features, objectives, and advantages of this application will become evident in the specification, drawings, and claims.

BRIEF DESCRIPTION OF THE DRAWINGS

To describe the technical solutions in the embodiments of this application more clearly, the following briefly describes the drawings required for describing the embodiments. Evidently, the drawings in the following description show merely a part of embodiments of this application, and a person of ordinary skill in the art may derive other drawings from the outlined drawings without making any creative effort.

DESCRIPTION OF EMBODIMENTS

To make the objectives, technical solutions, and advantages of this application clearer, the following describes this application in further detail with reference to drawings and embodiments. Understandably, the specific embodiments described herein are merely intended to explain this application, but are not intended to limit this application.

Speech technology includes the following key techniques: automatic speech recognition (ASR), text to speech (TTS), and voiceprint recognition. Making computers able to hear, see, speak, and feel is a development trend of human-computer interaction in the future. Speech interaction becomes one of the most promising human-computer interaction methods in the future.

Solutions provided in embodiments of this application relate to artificial intelligence technologies such as speech technology, and are specifically described below using the following embodiments.

Figure 1:
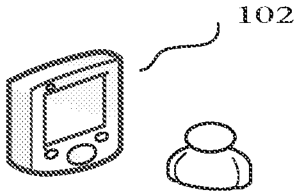
FIG. 1 is an application environment diagram of a speech coding method according to an embodiment.

A speech coding method according to this application is applicable to an environment shown in FIG. 1. A terminal 102 collects a sound signal sent by a user. The terminal 102 obtains a to-be-encoded speech frame and a subsequent speech frame corresponding to the to-be-encoded speech frame. The terminal 102 extracts at least one to-be-encoded speech frame feature corresponding to the to-be-encoded speech frame, and obtains a to-be-encoded speech frame criticality level corresponding to the to-be-encoded speech frame based on the to-be-encoded speech frame feature. The terminal 102 extracts a subsequent speech frame feature corresponding to the subsequent speech frame, and obtains a subsequent speech frame criticality level corresponding to the subsequent speech frame based on the subsequent speech frame feature. The terminal 102 obtains a criticality trend feature based on the to-be-encoded speech frame criticality level and the subsequent speech frame criticality level, and determines, by using the criticality trend feature, an encoding bit rate corresponding to the to-be-encoded speech frame. The terminal 102 encodes the to-be-encoded speech frame based on the encoding bit rate to obtain an encoding result. The terminal 102 may be, but is not limited to, various personal computers with a recording function, notebook computers with a recording function, smartphones with a recording function, and tablet computers and audio broadcasting devices with a recording function. Understandably, the speech coding method is also applicable to a server, and also applicable to a system that includes a terminal and a server. The server may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communications, a middleware service, a domain name service, a security service, a content delivery network (CDN), and a big data and artificial intelligence platform.

Figure 2:
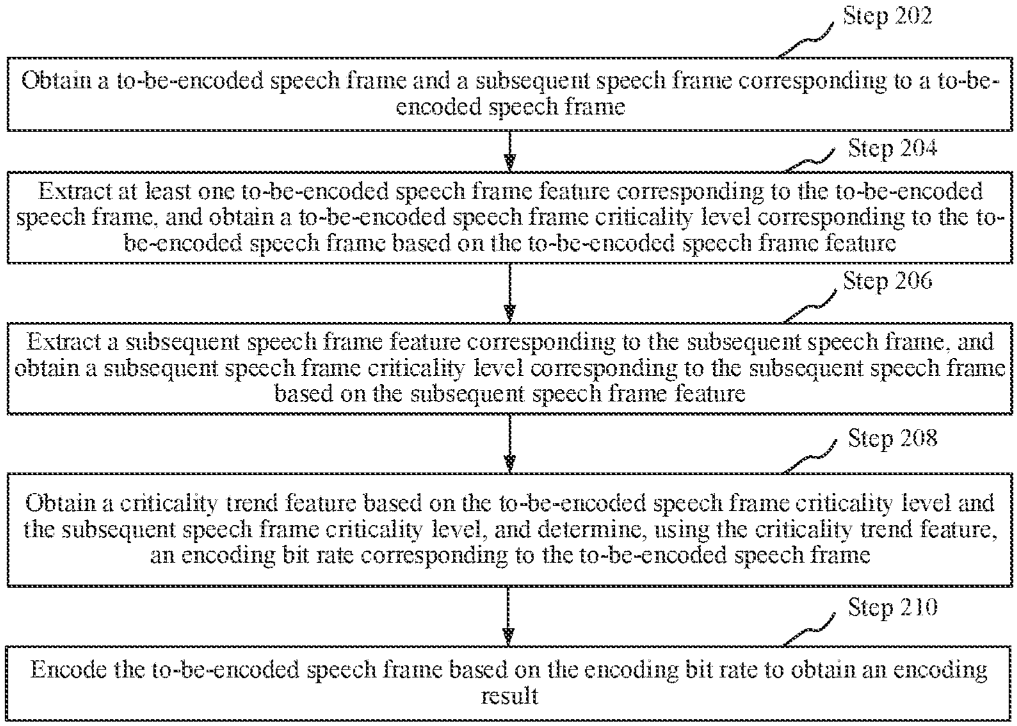
FIG. 2 is a schematic flowchart of a speech coding method according to an embodiment.

In an embodiment, as shown in FIG. 2, a speech coding method is provided. Using an example in which the method is applied to the terminal shown in FIG. 1, the method includes the following steps:

Step 202: Obtain a to-be-encoded speech frame and a subsequent speech frame corresponding to the to-be-encoded speech frame.

The speech frame is obtained by dividing speech into frames. The to-be-encoded speech frame means a speech frame that currently needs to be encoded. The subsequent speech frame means a speech frame to occur at a future time and corresponding to the to-be-encoded speech frame, and is a speech frame to be collected after the to-be-encoded speech frame.

Specifically, the terminal may collect a speech signal through a speech collecting apparatus. The speech collecting apparatus may be a microphone. A speech signal collected by the terminal is converted into a digital signal, and then a to-be-encoded speech frame and a subsequent speech frame corresponding to the to-be-encoded speech frame are obtained from the digital signal. There may be a plurality of subsequent speech frames. For example, the number of obtained subsequent speech frames is 3. Alternatively, the terminal A may obtain a speech signal pre-stored in an internal memory, converts the speech signal into a digital signal, and then, from the digital signal, obtains a to-be-encoded speech frame and a subsequent speech frame corresponding to the to-be-encoded speech frame. Alternatively, the terminal may download a speech signal from the Internet, converts the speech signal into a digital signal, and then, from the digital signal, obtains a to-be-encoded speech frame and a subsequent speech frame corresponding to the to-be-encoded speech frame. Alternatively, the terminal may obtain a speech signal sent by other terminals or servers, converts the speech signal into a digital signal, and then, from the digital signal, obtains a to-be-encoded speech frame and a subsequent speech frame corresponding to the to-be-encoded speech frame.

Step 204: Extract at least one to-be-encoded speech frame feature corresponding to the to-be-encoded speech frame, and obtain a to-be-encoded speech frame criticality level corresponding to the to-be-encoded speech frame based on the to-be-encoded speech frame feature.

The speech frame feature is a feature serving as a measure of sound quality of the speech frame. Speech frame features include but are not limited to a speech starting frame feature, an energy change feature, a pitch period modulation frame feature, and a non-speech frame feature. The speech starting frame feature is a feature corresponding to a starting speech frame of the speech signal. The energy change feature is a feature of frame energy change between a current speech frame and a previous speech frame. The pitch period modulation frame feature is a feature of a pitch period corresponding to the speech frame. The non-speech frame feature is a feature corresponding to a noise speech frame. The to-be-encoded speech frame feature is a speech frame feature corresponding to the to-be-encoded speech frame. The speech frame criticality level means a level of contribution made by sound quality of a speech frame to overall speech quality within a period that includes some time points before and after the speech frame. The higher the contribution level, the higher the criticality level of the corresponding speech frame. The to-be-encoded speech frame criticality level is a speech frame criticality level corresponding to the to-be-encoded speech frame.

Specifically, the terminal extracts the to-be-encoded speech frame feature corresponding to the to-be-encoded speech frame based on a speech frame type corresponding to the to-be-encoded speech frame. The speech frame type may include at least one of a speech starting frame, an energy burst frame, a pitch period modulation frame, or a non-speech frame.

When the to-be-encoded speech frame is a speech starting frame, a corresponding speech starting frame feature is obtained based on the speech starting frame. When the to-be-encoded speech frame is an energy burst frame, a corresponding energy change feature is obtained based on the energy burst frame. When the to-be-encoded speech frame is a pitch period modulation frame, a corresponding pitch period modulation frame feature is obtained based on the pitch period modulation frame. When the to-be-encoded speech frame is a non-speech frame, a corresponding non-speech frame feature is obtained based on the non-speech frame.

Subsequently, weighting is performed based on the extracted to-be-encoded speech frame feature to obtain a to-be-encoded speech frame criticality level corresponding to the to-be-encoded speech frame. Positive weighting may be performed on the speech starting frame feature, the energy change feature, and the pitch period modulation frame feature to obtain a positive to-be-encoded speech frame criticality level. Negative weighting may be performed on the non-speech frame feature to obtain a negative to-be-encoded speech frame criticality level. A speech frame criticality level corresponding to the final to-be-encoded speech frame is obtained based on the positive to-be-encoded speech frame criticality level and the negative to-be-encoded speech frame criticality level.

Step 206: Extract a subsequent speech frame feature corresponding to the subsequent speech frame, and obtain a subsequent speech frame criticality level corresponding to the subsequent speech frame based on the subsequent speech frame feature.

The subsequent speech frame feature means a speech frame feature corresponding to the subsequent speech frame. Each subsequent speech frame has a corresponding subsequent speech frame feature. The subsequent speech frame criticality level means the speech frame criticality level corresponding to the subsequent speech frame.

Specifically, the terminal extracts the subsequent speech frame feature corresponding to the subsequent speech frame based on the speech frame type of the subsequent speech frame. When the subsequent speech frame is a speech starting frame, a corresponding speech starting frame feature is obtained based on the speech starting frame. When the subsequent speech frame is an energy burst frame, a corresponding energy change feature is obtained based on the energy burst frame. When the subsequent speech frame is a pitch period modulation frame, a corresponding pitch period modulation frame feature is obtained based on the pitch period modulation frame. When the subsequent speech frame is a non-speech frame, a corresponding non-speech frame feature is obtained based on the non-speech frame.

Subsequently, weighting is performed based on the subsequent speech frame feature to obtain a subsequent speech frame criticality level corresponding to the subsequent speech frame. Positive weighting may be performed on the speech starting frame feature, the energy change feature, and the pitch period modulation frame feature to obtain a positive criticality level of a subsequent speech frame. Negative weighting may be performed on the non-speech frame feature to obtain a negative criticality level of the subsequent speech frame. A final speech frame criticality level corresponding to the subsequent speech frame is obtained based on the positive criticality level of the subsequent speech frame and the negative criticality level of the subsequent speech frame.

In a specific embodiment, during calculation of the to-be-encoded speech frame criticality level corresponding to the to-be-encoded speech frame and the subsequent speech frame criticality level corresponding to the subsequent speech frame, the to-be-encoded speech frame feature and the subsequent speech frame feature may be inputted into a criticality measurement model for calculating to obtain a criticality pair of the to-be-encoded speech frame criticality level and the subsequent speech frame criticality level. The criticality measurement model is a model established by using a linear regression algorithm based on historical speech frame features and historical speech frame criticality levels, and is deployed in the terminal. The speech frame criticality level is identified by using the criticality measurement model, thereby improving accuracy and efficiency.

Step 208: Obtain a criticality trend feature based on the to-be-encoded speech frame criticality level and the subsequent speech frame criticality level, and determine, by using the criticality trend feature, an encoding bit rate corresponding to the to-be-encoded speech frame.

The criticality trend means a trend of speech frame criticality levels of the to-be-encoded speech frame and the corresponding subsequent speech frame. For example, the criticality trend is that the speech frame criticality level is increasing, or the speech frame criticality level is decreasing, the speech frame criticality level remains unchanged. The criticality trend feature means a feature that reflects the criticality trend, and may be a statistical feature, such as criticality average, criticality difference, and the like. The encoding bit rate is used for encoding the to-be-encoded speech frame.

Specifically, the terminal obtains a criticality trend feature based on the to-be-encoded speech frame criticality level and the subsequent speech frame criticality level. For example, the terminal calculates a statistical feature of the to-be-encoded speech frame criticality level and the subsequent speech frame criticality level, and uses the calculated statistical feature as a criticality trend feature. The statistical feature may include at least one of an average speech frame criticality feature, median speech frame criticality feature, standard deviation speech frame criticality feature, mode speech frame criticality feature, range speech frame criticality feature, or speech frame criticality difference feature. The encoding bit rate corresponding to the to-be-encoded speech frame is calculated by using the criticality trend feature and a preset bit rate calculation function. The bit rate calculation function is a monotonically increasing function, and is user-definable. Each criticality trend feature may have a corresponding bit rate calculation function, or different criticality trend features may have the same bit rate calculation function.

Step 210: Encode the to-be-encoded speech frame based on the encoding bit rate to obtain an encoding result.

Specifically, when the encoding bit rate is obtained, the to-be-encoded speech frame is encoded with the encoding bit rate to obtain an encoding result. The encoding result is a bitstream corresponding to the to-be-encoded speech frame. The terminal may store the bitstream in an internal memory, or send the bitstream to a server for storing on the server. The to-be-encoded speech frame may be encoded with a speech encoder.

In an embodiment, to play the collected speech, the stored bitstream is obtained and decoded, and finally played back by a speech playback apparatus such as a speaker of the terminal.

In the speech coding method above, the to-be-encoded speech frame and the subsequent speech frame corresponding to the to-be-encoded speech frame are obtained. The to-be-encoded speech frame criticality level corresponding to the to-be-encoded speech frame and the subsequent speech frame criticality level corresponding to subsequent speech frame are calculated separately. Subsequently, the criticality trend feature is obtained based on the to-be-encoded speech frame criticality level and the subsequent speech frame criticality level. The encoding bit rate corresponding to the to-be-encoded speech frame is determined by using the criticality trend feature. Therefore, an encoding result is obtained by encoding using the encoding bit rate. In other words, the encoding bit rate can be regulated based on the criticality trend feature of the speech frame, so that each to-be-encoded speech frame has a regulated encoding bit rate, and then the encoding is performed by using the regulated encoding bit rate. Therefore, when the criticality trend becomes stronger, a higher encoding bit rate is assigned to the to-be-encoded speech frame for encoding. When the criticality trend becomes weaker, a lower encoding bit rate is assigned to the to-be-encoded speech frame for encoding. In this way, the encoding bit rate corresponding to each to-be-encoded speech frame can be adaptively controlled to avoid redundant encoding and improve speech coding quality.

Figure 3:
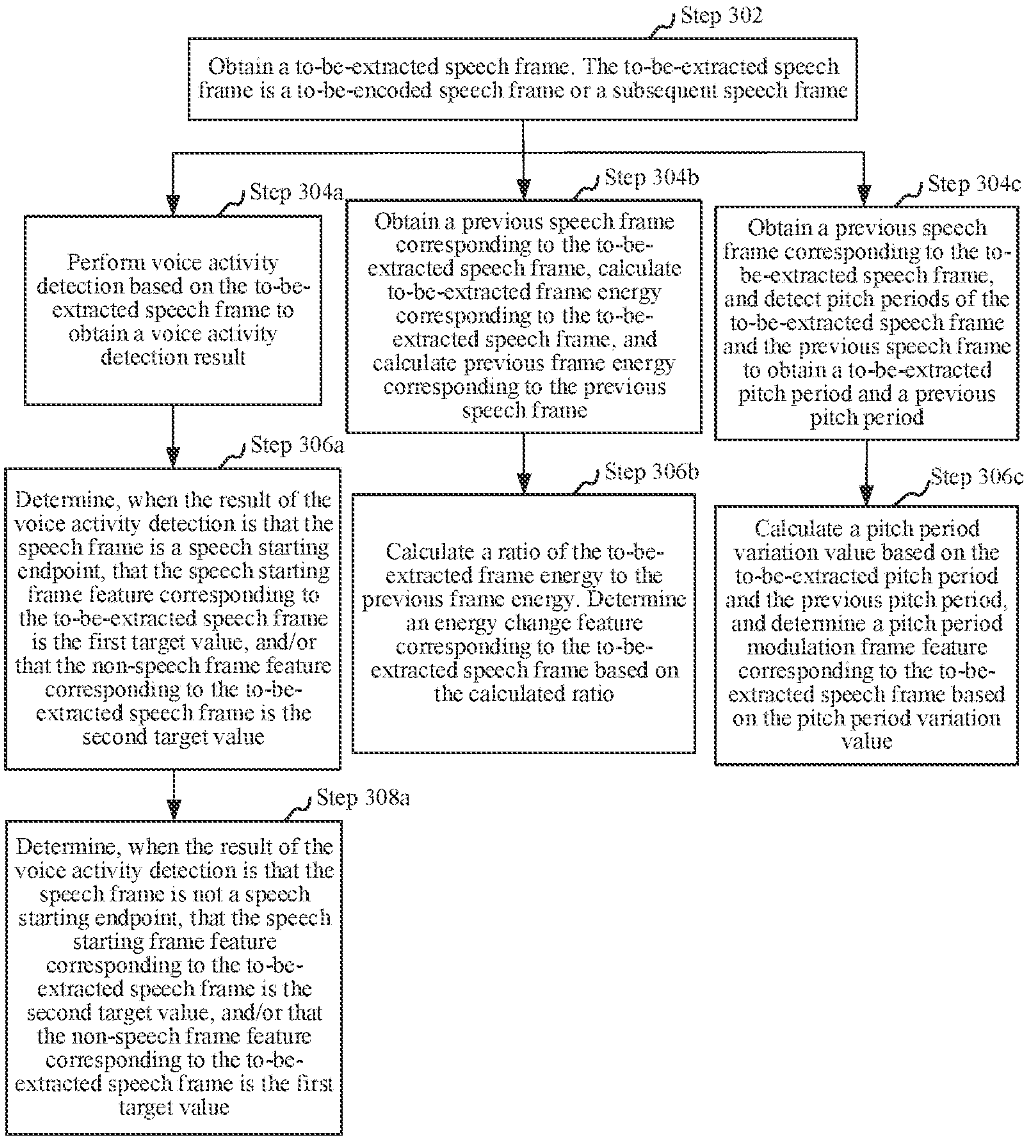
FIG. 3 is a schematic flowchart of feature extraction according to an embodiment.

In an embodiment, the to-be-encoded speech frame feature and the subsequent speech frame feature include at least one of a speech starting frame feature or a non-speech frame feature. As shown in FIG. 3, the extracting of the speech starting frame feature and the non-speech frame feature includes the following steps:

Step 302: Obtain a to-be-extracted speech frame. The to-be-extracted speech frame is at least one of the to-be-encoded speech frame or the subsequent speech frame.

Step 304*a*: Perform voice activity detection based on the to-be-extracted speech frame to obtain a voice activity detection result.

The to-be-extracted speech frame is a speech frame for which a speech frame feature needs to be extracted, and may be a to-be-encoded speech frame or a subsequent speech frame. Voice activity detection (VAD) is a process of detecting a speech starting endpoint in a speech signal, that is, a transition point of the speech signal from 0 to 1, by using a VAD algorithm. The VAD algorithm may be a decision algorithm based on a sub-band signal-to-noise ratio, a deep neural network (DNN)-based speech frame decision algorithm, a transitory energy-based voice activity detection algorithm, or a dual-threshold-based voice activity detection algorithm, or the like. The result of the voice activity detection is a detection result indicating whether the to-be-extracted speech frame is a speech endpoint, that is, whether the speech frame is a speech starting endpoint or the speech frame is not a speech starting endpoint.

Specifically, the server performs voice activity detection on the to-be-extracted speech frame by using the voice activity detection algorithm, so as to obtain a voice activity detection result.

Step 306*a*: Determine, when a result of the voice activity detection is that the speech frame is a speech starting endpoint, at least one of (i) a speech starting frame feature corresponding to the to-be-extracted speech frame is a first target value, or (ii) a non-speech frame feature corresponding to the to-be-extracted speech frame is a second target value.

The speech starting endpoint means that the to-be-extracted speech frame is a start of the speech signal. The first target value is a specific value of the feature. The first target value corresponding to each different feature has a different meaning. When the feature of the speech starting frame is the first target value, the first target value is used for indicating that the to-be-extracted speech frame is a speech starting endpoint. When the non-speech frame feature is the first target value, the first target value is used for indicating that the to-be-extracted speech frame is a noise speech frame. The second target value is a specific value of the feature. The second target value corresponding to each different feature has a different meaning. When the feature of the non-speech frame is the second target value, the second target value is used for indicating that the to-be-extracted speech frame is a non-noise speech frame. When the speech starting frame feature is the second target value, the second target value is used for indicating that the to-be-extracted speech frame is not a speech starting endpoint. For example, the first target value is 1, and the second target value is 0.

Specifically, when the result of the voice activity detection is that the speech frame is a speech starting endpoint, it is determined that the speech starting frame feature corresponding to the to-be-extracted speech frame is the first target value, and that the non-speech frame feature corresponding to the to-be-extracted speech frame is the second target value. In an embodiment, when the result of the voice activity detection is that the speech frame is a speech starting endpoint, it is determined that the speech starting frame feature corresponding to the to-be-extracted speech frame is the first target value, or that the non-speech frame feature corresponding to the to-be-extracted speech frame is the second target value.

Step 308*a* Determine, when the result of the voice activity detection is that the speech frame is not a speech starting endpoint, at least one of (i) the speech starting frame feature corresponding to the to-be-extracted speech frame is the second target value, and (ii) the non-speech frame feature corresponding to the to-be-extracted speech frame is the first target value.

Being not a speech starting endpoint means that the to-be-extracted speech frame is not a starting point of the speech signal. That is, the to-be-extracted speech frame is a noise signal before the speech signal.

Specifically, when the result of the voice activity detection is that the speech frame is not a speech starting endpoint, the second target value is directly used as the speech starting frame feature corresponding to the to-be-extracted speech frame, and the first target value is directly used as the non-speech frame feature corresponding to the to-be-extracted speech frame. In an embodiment, when the result of the voice activity detection is that the speech frame is not a speech starting endpoint, the second target value is directly used as the speech starting frame feature corresponding to the to-be-extracted speech frame, or the first target value is directly used as the non-speech frame feature corresponding to the to-be-extracted speech frame.

In the embodiment above, the voice activity detection is performed on the to-be-extracted speech frame to obtain the speech starting frame feature and the non-speech frame feature, thereby improving efficiency and accuracy.

In an embodiment, the to-be-encoded speech frame feature and the subsequent speech frame feature include an energy change feature. As shown in FIG. 3, the extracting of the energy change feature includes the following steps:

Step 302: Obtain a to-be-extracted speech frame. The to-be-extracted speech frame is the to-be-encoded speech frame or the subsequent speech frame.

Step 304*b*: Obtain a previous speech frame corresponding to the to-be-extracted speech frame, calculate to-be-extracted frame energy corresponding to the to-be-extracted speech frame, and calculate previous frame energy corresponding to the previous speech frame.

The previous speech frame is a frame previous to the to-be-extracted speech frame, and is a speech frame that has been obtained before the to-be-extracted speech frame. For example, if a to-be-extracted frame is the $8^{th}$ frame, the previous speech frame may be the $7^{th}$ frame. The frame energy is used for reflecting the strength of the speech frame signal. The to-be-extracted frame energy means the frame energy corresponding to the to-be-extracted speech frame. The previous frame energy is the frame energy corresponding to the previous speech frame.

Specifically, the terminal obtains the to-be-extracted speech frame. The to-be-extracted speech frame is a to-be-encoded speech frame or a subsequent speech frame. The previous speech frame corresponding to the to-be-extracted speech frame is obtained. The to-be-extracted frame energy corresponding to the to-be-extracted speech frame is calculated, and the previous frame energy corresponding to previous speech frame is calculated at the same time. The energy of the to-be-extracted frame or the previous frame energy may be obtained by calculating the sum of squares of all digital signals in the to-be-extracted speech frame or the previous speech frame. Alternatively, samples may be taken from all digital signals in the to-be-extracted speech frame or the previous speech frame, and the sum of squares of the sampled data to obtain the to-be-extracted frame energy or the previous speech frame energy.

Step 306*c*: Calculate a ratio of the to-be-extracted frame energy to the previous frame energy. Determine an energy change feature corresponding to the to-be-extracted speech frame based on the calculated ratio.

Specifically, the terminal calculates the ratio of the to-be-extracted frame energy to the previous frame energy, and determines an energy change feature corresponding to the to-be-extracted speech frame based on the calculated ratio. When the calculated ratio is greater than a preset threshold, it means that the frame energy of the to-be-extracted speech frame varies greatly from the frame energy of the previous frame, and the corresponding energy change feature is 1. When the calculated ratio is not greater than the preset threshold, it means that the frame energy change of the to-be-extracted speech frame varies little from the frame energy of the previous frame, and the corresponding energy change feature is 0. In an embodiment, the energy change feature corresponding to the to-be-extracted speech frame may be determined based on the calculated ratio and the to-be-extracted frame energy. When the to-be-extracted frame energy is greater than a preset frame energy and the calculated ratio is greater than a preset threshold, it indicates that the to-be-extracted speech frame is a speech frame with abruptly increasing frame energy, and the corresponding energy change feature is 1. When the to-be-extracted frame energy is not greater than the preset frame energy or the calculated ratio is not greater than the preset threshold, it indicates that the to-be-extracted speech frame is not a speech frame with abruptly increasing frame energy, and the corresponding energy change feature is 0. The preset threshold is a preset value, for example, the calculated ratio is higher than a preset multiplying factor. The preset frame energy is a preset frame energy threshold.

In the embodiment above, the to-be-extracted frame energy and the previous frame energy are calculated. The energy change feature corresponding to the to-be-extracted speech frame is determined based on the to-be-extracted frame energy and the previous frame energy, thereby improving accuracy of the obtained energy change feature.

In an embodiment, the calculating the to-be-extracted frame energy corresponding to the to-be-extracted speech frame includes:

taking samples of data based on the to-be-extracted speech frame to obtain a data value of each sample and the number of samples, calculating a sum of squares of data values of all samples, and calculating a ratio of the sum of squares to the number of samples to obtain the to-be-extracted frame energy.

The data value of the sample is the data obtained by sampling the to-be-extracted speech frame. The number of samples is the total number of data samples taken.

Specifically, the terminal performs data sampling on the to-be-extracted speech frame to obtain a data value of each sample and the number of samples. The terminal calculates a sum of squares of data values of all samples, and calculates a ratio of the sum of squares to the number of samples as the to-be-extracted frame energy. The to-be-extracted frame energy may be calculated by the following formula (0):

$$\frac{1}{m}\sum_{i=0}^{m-1}x^2(i) \qquad \text{Formula (1)}$$

In the formula above, m is the number of samples, x is a data value of a sample, and a data value of an $i^{th}$ sample is x(i).

In a specific embodiment, every 20 ms is one frame, and a sampling rate is 16 kHz. Therefore, the data values of 320 samples are obtained after data sampling. The data value of each sample is a 16-bit numeral including at least one symbol, and falls within a value range 1-32768, 327671. As shown in the drawing, the data value of the $i^{th}$ sample is x(i), and therefore, the frame energy of this frame is $$\frac{1}{320}\sum_{i=0}^{319}x^2(i).$$

In an embodiment, the terminal performs data sampling based on the previous speech frame to obtain a data value of each sample and the number of samples. The terminal calculates a sum of squares of data values of all samples, and calculates a ratio of the sum of squares to the number of samples to obtain the previous frame energy. The terminal may use Formula (1) to calculate the previous frame energy corresponding to the previous speech frame.

In the embodiment above, the efficiency of obtaining the frame energy can be improved by taking samples of the data of the speech frame and then calculating the frame energy based on the sampled data and the number of samples.

In an embodiment, the to-be-encoded speech frame feature and the subsequent speech frame feature include a pitch period modulation frame feature. As shown in FIG. 3, the extracting of the pitch period modulation frame feature includes the following operations:

Step 302: Obtain a to-be-extracted speech frame. The to-be-extracted speech frame is a to-be-encoded speech frame or a subsequent speech frame.

Step 304*c*: Obtain a previous speech frame corresponding to the to-be-extracted speech frame, and detect pitch periods of the to-be-extracted speech frame and the previous speech frame to obtain a to-be-extracted pitch period and a previous pitch period.

The pitch period is a time of period in which a vocal cord opens and closes once. The to-be-extracted pitch period is a pitch period corresponding to the to-be-extracted speech frame, that is, the pitch period corresponding to the to-be-encoded speech frame or the pitch period corresponding to the subsequent speech frame.

Specifically, the terminal obtains the to-be-extracted speech frame. The to-be-extracted speech frame may be a to-be-encoded speech frame or a subsequent speech frame. Subsequently, the terminal obtains a previous speech frame corresponding to the to-be-extracted speech frame, and detects, by using a pitch period detection algorithm, a pitch period corresponding to the to-be-extracted speech frame and a pitch period corresponding to the previous speech frame separately, so as to obtain a to-be-extracted pitch period and a previous pitch period. The pitch period detection algorithm may be classed into a non-time-based pitch period detection method and a time-based pitch period detection method. Non-time-based pitch period detection methods include an autocorrelation function method, an average amplitude difference function method, a cepstrum method, and the like. Time-based pitch period detection methods include a waveform estimation method, a correlation processing method, and a transformation method.

Step 306*c*: Calculate a pitch period variation value based on the to-be-extracted pitch period and the previous pitch period, and determine a pitch period modulation frame feature corresponding to the to-be-extracted speech frame based on the pitch period variation value.

The pitch period variation value is used for reflecting a variation between the pitch period of the previous speech frame and the pitch period of the to-be-extracted speech frame.

Specifically, the terminal calculates an absolute value of a difference between the previous pitch period and the to-be-extracted pitch period to obtain a pitch period variation value. When the pitch period variation value exceeds a preset period variation threshold, it means that the to-be-extracted speech frame is a pitch period modulation frame. In this case, the obtained pitch period modulation frame feature may be denoted by "1" When the pitch period variation value does not exceed the preset period variation threshold, it means that the pitch period of the to-be-extracted speech frame has not mutated against the previous frame. In this case, the obtained pitch period modulation frame feature may be denoted by "0".

In the embodiment above, the previous pitch period and the to-be-extracted pitch period are detected, and the pitch period modulation frame feature is obtained based on the previous pitch period and the to-be-extracted pitch period, thereby improving accuracy of the obtained pitch period modulation frame feature.

Figure 4:
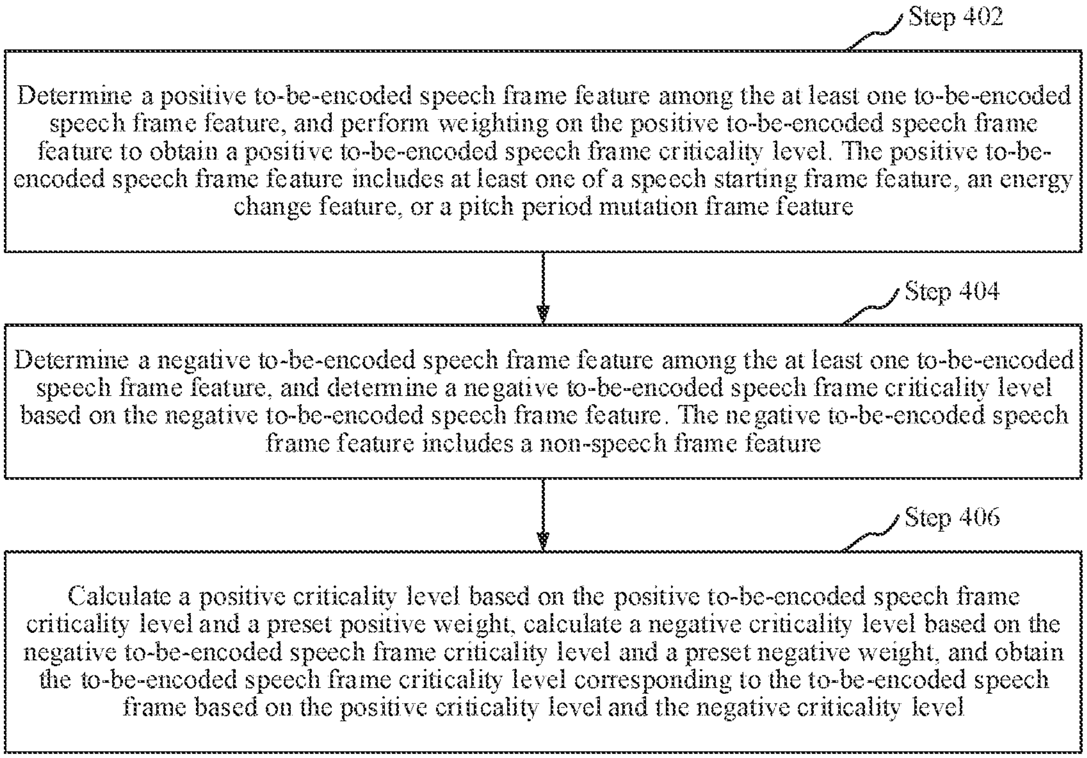
FIG. 4 is a schematic flowchart of calculating a to-be-encoded speech frame criticality level according to an embodiment.

In an embodiment, as shown in FIG. 4, the obtaining a to-be-encoded speech frame criticality level corresponding to the to-be-encoded speech frame based on the to-be-encoded speech frame feature in step 204 includes:

Step 402: Determine a positive to-be-encoded speech frame feature among the at least one to-be-encoded speech frame feature, and perform weighting on the positive to-be-encoded speech frame feature to obtain a positive to-be-encoded speech frame criticality level. The positive to-be-encoded speech frame feature includes at least one of a speech starting frame feature, an energy change feature, or a pitch period modulation frame feature.

The positive to-be-encoded speech frame feature means a speech frame feature positively correlated with the speech frame criticality level, including at least one of a speech starting frame feature, an energy change feature, or a pitch period modulation frame feature. The more obvious the positive to-be-encoded speech frame feature, the higher the speech frame criticality level. The positive to-be-encoded speech frame criticality level is a speech frame criticality level obtained based on the to the positive to-be-encoded speech frame feature.

Specifically, the terminal determines at least one positive to-be-encoded speech frame feature among the to-be-encoded speech frame features, obtains a preset weight corresponding to each positive to-be-encoded speech frame feature, assigns the weight to each positive to-be-encoded speech frame feature, and then takes statistics of weighting results to obtain a positive to-be-encoded speech frame criticality level.

Step 404: Determine a negative to-be-encoded speech frame feature among the at least one to-be-encoded speech frame feature, and determine a negative to-be-encoded speech frame criticality level based on the negative to-be-encoded speech frame feature. The negative to-be-encoded speech frame feature includes a non-speech frame feature.

The negative to-be-encoded speech frame feature means a speech frame feature negatively correlated with the speech frame criticality level, including a non-speech-frame feature. The more obvious the negative to-be-encoded speech frame feature, the lower the speech frame criticality level. The negative to-be-encoded speech frame criticality level is a speech frame criticality level obtained based on the to the negative to-be-encoded speech frame feature.

Specifically, the terminal determines a negative to-be-encoded speech frame feature among the at least one to-be-encoded speech frame feature, and determines a negative to-be-encoded speech frame criticality level based on the negative to-be-encoded speech frame feature. In a specific embodiment, when the non-speech-frame feature is 1, it means that the speech frame is noise. In this case, the speech frame criticality level of the noise is 0. When the non-speech-frame feature is 0, it means that the speech frame is a collected speech frame. In this case, the speech frame criticality level of the speech is 1.

Step 406: Calculate a positive criticality level based on the positive to-be-encoded speech frame criticality level and a preset positive weight, calculate a negative criticality level based on the negative to-be-encoded speech frame criticality level and a preset negative weight, and obtain the to-be-encoded speech frame criticality level corresponding to the to-be-encoded speech frame based on the positive criticality level and the negative criticality level.

The preset positive weight is a preset weight of the positive to-be-encoded speech frame criticality level. The preset negative weight is a preset weight of the negative to-be-encoded speech frame criticality level.

Specifically, the terminal obtains a positive criticality level by multiplying the positive to-be-encoded speech frame criticality level by a preset positive weight, obtains a negative criticality level by multiplying the negative to-be-encoded speech frame criticality level by a preset negative weight, and adds up the positive criticality level and the negative criticality level to obtain the to-be-encoded speech frame criticality level corresponding to the to-be-encoded speech frame. For example, a product of the positive criticality level and the negative criticality level may be calculated to obtain the to-be-encoded speech frame criticality level. In a specific embodiment, the to-be-encoded speech frame criticality level corresponding to the to-be-encoded speech frame may be calculated by using the following Formula (2).

$$r=b+(1-r_4)*(w_1*r_1+w_2*r_2+w_3*r_3) \quad \text{Formula(2)}$$

In the formula above, r is the to-be-encoded speech frame criticality level, $r_1$ is the speech starting frame feature, $r_2$ is the energy change feature, $r_3$ is the pitch period mutation frame feature, w is a preset weight $w_1$ is a weight corresponding to the speech starting frame feature, $w_2$ is a weight corresponding to the energy change feature, and $w_3$ is a weight corresponding to the pitch period modulation frame feature. $w_1*r_1+w_2*r_2+w_3*r_3$ is the positive to-be-encoded speech frame criticality level. $r_4$ is the non-speech-frame feature, and $(1-r_4)$ is the negative to-be-encoded speech frame criticality level. b is a constant and a positive number, and is a positive bias. In the formula above, the specific value of b may be 0.1, and the specific values of $w_1$, $w_2$, and $w_3$ may be all 0.3.

In an embodiment, the subsequent speech frame criticality level corresponding to the subsequent speech frame may be calculated based on the subsequent speech frame feature by using Formula (2). Specifically, the speech starting frame feature, the energy change feature, and the pitch period modulation frame feature corresponding to the subsequent speech frame may be weighted to obtain a positive criticality level corresponding to the subsequent speech frame. A negative criticality level corresponding to the subsequent speech frame may be determined based on the non-speech-frame feature corresponding to the subsequent speech frame. The subsequent speech frame criticality level corresponding to the subsequent speech frame is calculated based on the positive criticality level and the negative criticality level.

In the embodiment above, the positive to-be-encoded speech frame feature and the negative to-be-encoded speech frame feature are determined among the to-be-encoded speech frame features, and then the corresponding positive to-be-encoded speech frame criticality level and negative to-be-encoded speech frame criticality level are calculated separately to finally obtain the to-be-encoded speech frame criticality level, thereby improving accuracy of the obtained to-be-encoded speech frame criticality level.

In an embodiment, the obtaining a criticality trend feature based on the to-be-encoded speech frame criticality level and the subsequent speech frame criticality level, and determining, by using the criticality trend feature, an encoding bit rate corresponding to the to-be-encoded speech frame, include:

obtaining a previous speech frame criticality level, obtaining a target criticality trend feature based on the previous speech frame criticality level, the to-be-encoded speech frame criticality level, and the subsequent speech frame criticality level, and determining, by using the target criticality trend feature, the encoding bit rate corresponding to the to-be-encoded speech frame.

The previous speech frame is a speech frame that has been encoded before the to-be-encoded speech frame. The previous speech frame criticality level means the speech frame criticality level corresponding to the previous speech frame.

Specifically, the terminal may obtain the previous speech frame criticality level, calculates a criticality average value of the previous speech frame criticality level, the to-be-encoded speech frame criticality level, and the subsequent speech frame criticality level, calculates a criticality difference value of the previous speech frame criticality level, to-be-encoded speech frame criticality level, and the subsequent speech frame criticality level, obtains a target criticality trend feature based on the criticality average value and the criticality difference value, and determines, by using the target criticality trend feature, an encoding bit rate corresponding to the to-be-encoded speech frame. The terminal calculates a criticality sum of the previous speech frame criticality levels of 2 previous speech frames, the to-be-encoded speech frame criticality level, and the subsequent speech frame criticality levels of 3 subsequent speech frames, and divides the criticality sum by 6 to obtain a ratio that is the criticality average value. The terminal calculates a sum of the previous speech frame criticality levels of 2 previous speech frames and the to-be-encoded speech frame criticality level to obtain a partial criticality sum, and calculates a difference between the criticality sum and the partial criticality sum to obtain a criticality difference value, thereby obtaining a target criticality trend feature.

In the embodiment above, the terminal obtains the target criticality trend feature by using the previous speech frame criticality level, the to-be-encoded speech frame criticality level, and the subsequent speech frame criticality level, and then determines the encoding bit rate corresponding to the to-be-encoded speech frame by using the target criticality trend feature, thereby increasing accuracy of the obtained encoding bit rate corresponding to the to-be-encoded speech frame.

Figure 5:
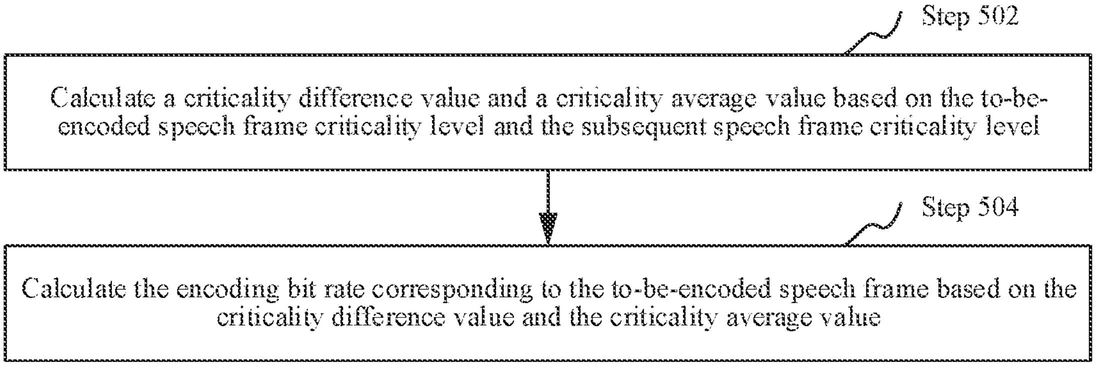
FIG. 5 is a schematic flowchart of calculating an encoding bit rate according to an embodiment.

In an embodiment, as shown in FIG. 5, the obtaining a criticality trend feature based on the to-be-encoded speech frame criticality level and the subsequent speech frame criticality level, and determining, by using the criticality trend feature, an encoding bit rate corresponding to the to-be-encoded speech frame in step 208, include:

Step 502: Calculate a criticality difference value and a criticality average value based on the to-be-encoded speech frame criticality level and the subsequent speech frame criticality level.

The criticality difference value is used for reflecting a criticality difference between the subsequent speech frame and the to-be-encoded speech frame. The criticality average value is used for reflecting a criticality average of the to-be-encoded speech frame and the subsequent speech frame.

Specifically, a server takes statistics based on the to-be-encoded speech frame criticality level and the subsequent speech frame criticality level, that is, calculates an average criticality level of the to-be-encoded speech frame criticality level and the subsequent speech frame criticality level, to obtain a criticality average value, and subtracting the to-be-encoded speech frame criticality level from a sum of the to-be-encoded speech frame criticality level and the subsequent speech frame criticality level to obtain a criticality difference value.

Step 504: Calculate the encoding bit rate corresponding to the to-be-encoded speech frame based on the criticality difference value and the criticality average value.

Specifically, a preset bit rate calculation function is obtained. The encoding bit rate corresponding to the to-be-encoded speech frame is calculated based on the criticality difference value and the criticality average value by using the bit rate calculation function. The bit rate calculation function is used for calculating the encoding bit rate, and is a monotonically increasing function that is user-definable depending on the application scenario. A first bit rate may be calculated based on a bit rate calculation function corresponding to the criticality difference value, and a second bit rate may be calculated based on a bit rate calculation function corresponding to the criticality average value, and therefore, a sum of the two bit rates is calculated as the encoding bit rate corresponding to the to-be-encoded speech frame. Alternatively, the bit rate corresponding to the criticality difference value and the bit rate corresponding to the criticality average value are calculated by using the same bit rate calculation function, and then a sum of the two bit rates is calculated as the encoding bit rate corresponding to the to-be-encoded speech frame.

In the embodiment above, the criticality difference value between the subsequent speech frame and the to-be-encoded speech frame as well as the criticality average value are calculated. The encoding bit rate corresponding to the to-be-encoded speech frame is calculated based on the criticality difference value and the criticality average value, thereby increasing precision of the obtained encoding bit rate.

Figure 6:
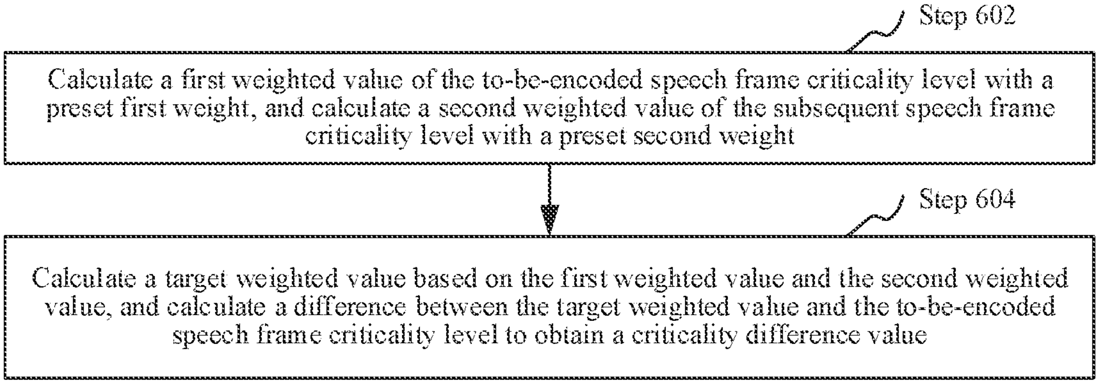
FIG. 6 is a schematic flowchart of obtaining a criticality difference value according to an embodiment.

In an embodiment, as shown in FIG. 6, the calculating a criticality difference value based on the to-be-encoded speech frame criticality level and the subsequent speech frame criticality level in step 502 includes:

Step 602: Calculate a first weighted value of the to-be-encoded speech frame criticality level with a preset first weight, and calculate a second weighted value of the subsequent speech frame criticality level with a preset second weight.

The preset first weight is a preset weight corresponding to the to-be-encoded speech frame criticality level. The preset second weight is a weight corresponding to the subsequent speech frame criticality level. Each subsequent speech frame has a corresponding subsequent speech frame criticality level. Each subsequent speech frame criticality level has a corresponding weight. The first weighted value is a value obtained by weighting the to-be-encoded speech frame criticality level. The second weighted value is a value obtained by weighting the subsequent speech frame criticality level.

Specifically, the terminal calculates a product of the to-be-encoded speech frame criticality level and the preset first weight to obtain a first weighted value, and calculates a product of the subsequent speech frame criticality level and the preset second weight to obtain a second weighted value.

Step 604: Calculate a target weighted value based on the first weighted value and the second weighted value, and calculate a difference between the target weighted value and the to-be-encoded speech frame criticality level to obtain a criticality difference value.

The target weighted value is a sum of the first weighted value and the second weighted value.

Specifically, the terminal calculates the sum of the first weighted value and the second weighted value to obtain a target weighted value, then calculates a difference between the target weighted value and the to-be-encoded speech frame criticality level, and uses the difference as a criticality difference value. In a specific embodiment, the criticality difference value may be calculated by using Formula (3):

$$\Delta R(i) = \left(\sum_{j=0}^{N-1} a_j * r(i+j)\right) - r(i) \quad \text{Formula (3)}$$

In the formula above, ΔR(i) is the criticality difference value, and N is the total number of frames of the to-be-encoded speech frames and the subsequent speech frames. r(i) denotes the to-be-encoded speech frame criticality level corresponding to the to-be-encoded speech frame, and r(j) denotes the subsequent speech frame criticality level corresponding to a $j^{th}$ subsequent speech frame. a means that the value range of the weight is (0, 1). When j is equal to 0, $a_0$ is the preset first weight. When j is greater than 0, $a_j$ is the preset second weight. There may be a plurality of preset second weights. The preset second weights corresponding to different subsequent speech frames may be the same or different. $a_j$ may increase with the increase of j.

$$\sum_{j=0}^{N-1} a_j * r(i+j)$$

denotes the target weighted value. In a specific embodiment, when there are 3 subsequent speech frames. N is 4, $a_0$ may be 0.1, $a_1$ may be 0.2, $a_2$ may be 0.3, and $a_3$ may be 0.4.

In the embodiment above, the target weighted value is calculated, and then the criticality difference value is calculated by using the target weighted value and the to-be-encoded speech frame criticality level, thereby improving accuracy of the obtained criticality difference value.

In an embodiment, the calculating a criticality average value based on the to-be-encoded speech frame criticality level and the subsequent speech frame criticality level in step 502 includes:

obtaining a frame quantity of the to-be-encoded speech frame and a frame quantity of the subsequent speech frame. Statistics of the to-be-encoded speech frame criticality level and the subsequent speech frame criticality level are performed to obtain an integrated criticality level. A ratio of the integrated criticality level to the frame quantity is calculated to obtain a criticality average value.

The frame quantity means a total number of the to-be-encoded speech frames and the subsequent speech frames. For example, when there are 3 subsequent speech frames, the obtained total number of frames is 4.

Specifically, the terminal obtains a frame quantity of the to-be-encoded speech frame and a frame quantity of the subsequent speech frame. The sum of the to-be-encoded speech frame criticality level and the subsequent speech frame criticality level is calculated as an integrated criticality level. Subsequently, the terminal calculates a ratio of the integrated criticality level to the frame quantity to obtain a criticality average value. In a specific embodiment, the criticality average value may be calculated by using Formula (4):

$$\overline{R}(i) = \frac{1}{N}\sum_{j=0}^{N-1} r(i+j) \qquad \text{Formula (4)}$$

In the formula above, $\overline{R}(i)$ is the criticality average value, and N is the number of frames of the to-be-encoded speech frames and the subsequent speech frames. r denotes speech frame criticality level, r(i) is used for denoting the to-be-encoded speech frame criticality level corresponding to the to-be-encoded speech frame, and r(j) denotes the subsequent speech frame criticality level corresponding to a $j^{th}$ subsequent speech frame.

In the embodiment above, the criticality average value is calculated by using the frame quantity of the to-be-encoded speech frames, the frame quantity of the subsequent speech frames, and the integrated criticality level, thereby improving the accuracy of the obtained criticality average value.

Figure 7:
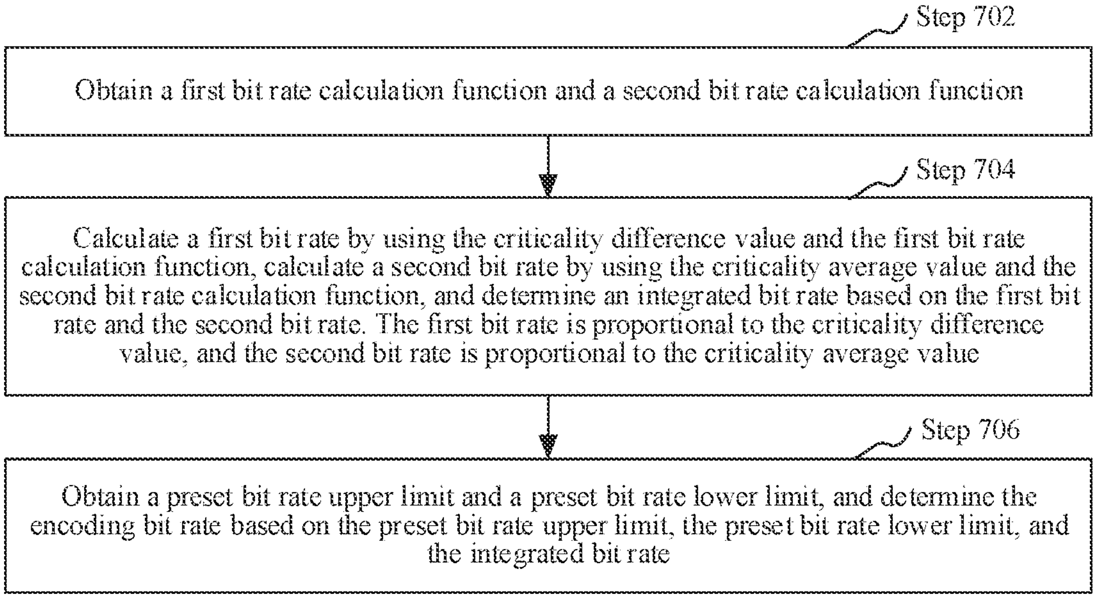
FIG. 7 is a schematic flowchart of determining an encoding bit rate according to an embodiment.

In an embodiment, as shown in FIG. 7, the calculating the encoding bit rate corresponding to the to-be-encoded speech frame based on the criticality difference value and the criticality average value in step 504 includes:

Step 702: Obtain a first bit rate calculation function and a second bit rate calculation function.

Step 704: Calculate a first bit rate by using the criticality average value and the first bit rate calculation function, calculate a second bit rate by using the criticality difference value and the second bit rate calculation function, and determine an integrated bit rate based on the first bit rate and the second bit rate. The first bit rate is proportional to the criticality average value, and the second bit rate is proportional to the criticality difference value.

The first bit rate calculation function is a preset function that calculates the bit rate by using the criticality average value. The second bit rate calculation function is a preset function that calculates the bit rate by using the criticality difference value. The first bit rate calculation function and the second bit rate calculation function may be set as specifically required in the application scenario. The first bit rate is a bit rate that is calculated by using the first bit rate calculation function. The second bit rate is a bit rate that is calculated by using the second bit rate calculation function. The integrated bit rate is a bit rate that is obtained by integrating the first bit rate and the second bit rate. For example, a sum of the first bit rate and the second bit rate may be calculated as the integrated bit rate.

Specifically, the terminal obtains the preset first bit rate calculation function and second bit rate calculation function, calculates a first bit rate and a second bit rate by using the criticality average value and the criticality difference value, respectively, and then calculates a sum of the first bit rate and the second bit rate as the integrated bit rate.

In a specific embodiment, the integrated bit rate may be calculated by using Formula (5).

$$f_1(\overline{R}(i))+f_2(\Delta R(i)) \qquad \text{Formula (5)}$$

In the formula above, $\overline{R}(i)$ is the criticality average value, $\Delta R(i)$ is the criticality difference value, $f_1(\ )$ is the first bit rate calculation function, and $f_2(\ )$ is the second bit rate calculation function. The first bit rate is calculated by using $f_1(\overline{R}(i))$, and the second bit rate is calculated by using $f_2(\Delta R(i))$.

In a specific embodiment, Formula (6) may be used as the first bit rate calculation function, and Formula (7) may be used as the second bit rate calculation function.

$$f_1(\overline{R}(i))=p_0+c_0*(\overline{R}(i)+b_0) \qquad \text{Formula (6)}$$

$$f_2(\Delta R(i))=p_1+c_1*(\overline{R}(i)+b_1) \qquad \text{Formula (7)}$$

In the formulas above, $p_0$, $c_0$, $b_0$, $p_1$, $c_1$, and $b_1$ are all constants, and are positive numbers.

Step 706. Obtain a preset bit rate upper limit and a preset bit rate lower limit, and determine the encoding bit rate based on the preset bit rate upper limit, the preset bit rate lower limit, and the integrated bit rate.

Specifically, the preset bit rate upper limit is a preset maximum value of the encoding bit rate of the speech frame, and the preset bit rate lower limit is a preset minimum value of the encoding bit rate of the speech frame. The terminal obtains the preset bit rate upper limit and the preset bit rate lower limit, compares the preset bit rate upper limit and the preset bit rate lower limit with the integrated bit rate, and determines the final encoding bit rate based on a comparison result.

In the embodiment above, the first bit rate and the second bit rate are calculated by using the first bit rate calculation function and the second bit rate calculation function. Subsequently, the integrated bit rate is obtained based on the first bit rate and the second bit rate, thereby improving accuracy of the obtained integrated bit rate. Finally, the encoding bit rate is determined based on the preset bit rate upper limit, the preset bit rate lower limit, and the integrated bit rate, thereby making the obtained encoding bit rate even more accurate.

In an embodiment, the determining the encoding bit rate based on the preset bit rate upper limit, the preset bit rate lower limit, and the integrated bit rate in step 706 includes:

comparing the preset bit rate upper limit with the integrated bit rate. comparing the preset bit rate lower limit with the integrated bit rate when the integrated bit rate is less than the preset bit rate upper limit, using the integrated bit rate as the encoding bit rate when the integrated bit rate is greater than the preset bit rate lower limit.

Specifically, the terminal compares the preset bit rate upper limit with the integrated bit rate. When the integrated bit rate is less than the preset bit rate upper limit, it indicates that the integrated bit rate does not exceed the preset bit rate upper limit. In this case, the preset bit rate lower limit is compared with the integrated bit rate. When the integrated bit rate is greater than the preset bit rate lower limit, it indicates that the integrated bit rate exceeds the preset bit rate lower limit, and therefore, the integrated bit rate is directly used as the encoding bit rate. In an embodiment, the preset bit rate upper limit is compared with the integrated bit rate. When the integrated bit rate is greater than the preset bit rate upper limit, it indicates that the integrated bit rate exceeds the preset bit rate upper limit. In this case, the preset bit rate upper limit is directly used as the encoding bit rate. In an embodiment, the preset bit rate lower limit is compared with the integrated bit rate. When the integrated bit rate is less than the preset bit rate lower limit, it indicates that the integrated bit rate does not exceed the preset bit rate lower limit. In this case, the preset bit rate lower limit is used as the encoding bit rate.

In a specific embodiment, the encoding bit rate may be calculated by using Formula (8).

$$\text{bitrate}(i)=\max(\text{min\_bitrate},\min(\text{max\_bitrate},f_1(\overline{R}(i))+f_2(\Delta R(i)))) \quad \text{Formula (8)}$$

In the formula above, max_bitrate is the preset bit rate upper limit. min_bitrate is the preset bit rate lower limit. bitrate(i) denotes the encoding bit rate of the to-be-encoded speech frame.

In the embodiment above, the encoding bit rate is determined by using the preset bit rate upper limit, the preset bit rate lower limit, and the integrated bit rate, thereby ensuring that the encoding bit rate of the speech frame falls within the preset bit rate range, and ensuring overall speech coding quality.

In an embodiment, the encoding the to-be-encoded speech frame based on the encoding bit rate to obtain an encoding result in step 210 includes:

transmitting the encoding bit rate to a standard encoder through an interface to obtain an encoding result, the standard encoder being configured to encode the to-be-encoded speech frame by using the encoding bit rate.

The standard encoder is configured to perform speech coding on the to-be-encoded speech frame. The interface is an external interface of the standard encoder, and is used for controlling the encoding bit rate.

Specifically, the terminal transmits the encoding bit rate into the standard encoder through the interface. Upon receiving the encoding bit rate, the standard encoder obtains the corresponding to-be-encoded speech frame, encodes the to-be-encoded speech frame to obtain an encoding result by using the encoding bit rate, thereby ensuring that accurate standard encoding results are obtained.

In a specific embodiment, a speech coding method is provided, including:

obtaining a to-be-encoded speech frame and a subsequent speech frame corresponding to the to-be-encoded speech frame. In this case, the to-be-encoded speech frame criticality level corresponding to the to-be-encoded speech frame and the subsequent speech frame criticality level corresponding to the subsequent speech frame are calculated in parallel.

Figure 8:
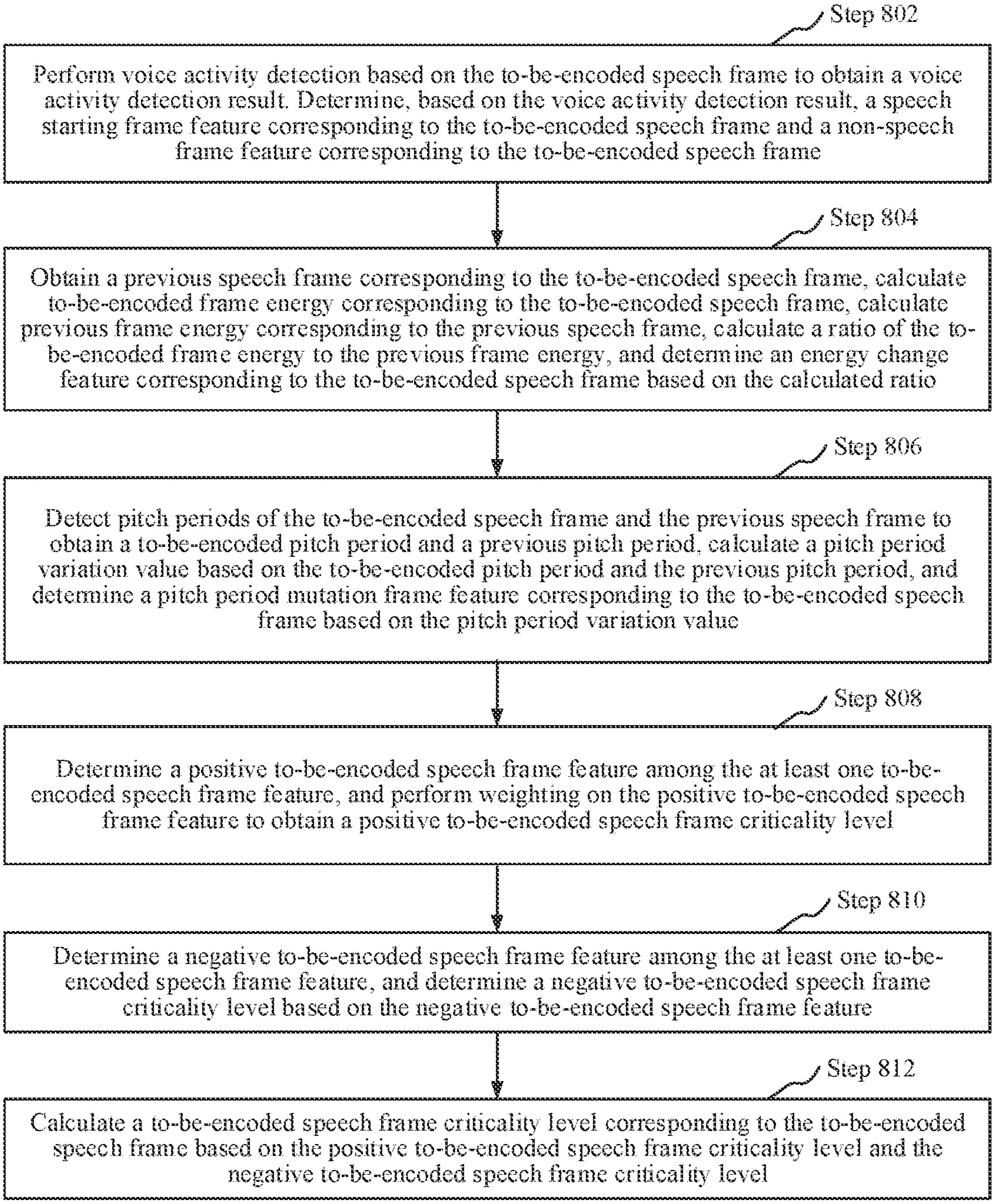
FIG. 8 is a schematic flowchart of calculating a to-be-encoded speech frame criticality level according to a specific embodiment.

As shown in FIG. 8, the obtaining a to-be-encoded speech frame criticality level corresponding to the to-be-encoded speech frame includes the following steps:

Step 802: Perform voice activity detection based on the to-be-encoded speech frame to obtain a voice activity detection result. Determine, based on the voice activity detection result, a speech starting frame feature corresponding to the to-be-encoded speech frame and a non-speech frame feature corresponding to the to-be-encoded speech frame.

Step 804: Obtain a previous speech frame corresponding to the to-be-encoded speech frame, calculate to-be-encoded frame energy corresponding to the to-be-encoded speech frame, calculate previous frame energy corresponding to the previous speech frame, calculate a ratio of the to-be-encoded frame energy to the previous frame energy, and determine an energy change feature corresponding to the to-be-encoded speech frame based on the calculated ratio.

Step 806: Detect pitch periods of the to-be-encoded speech frame and the previous speech frame to obtain a to-be-encoded pitch period and a previous pitch period, calculate a pitch period variation value based on the to-be-encoded pitch period and the previous pitch period, and determine a pitch period modulation frame feature corresponding to the to-be-encoded speech frame based on the pitch period variation value.

Step 808: Determine a positive to-be-encoded speech frame feature among the at least one to-be-encoded speech frame feature, and perform weighting on the positive to-be-encoded speech frame feature to obtain a positive to-be-encoded speech frame criticality level.

Step 810: Determine a negative to-be-encoded speech frame feature among the at least one to-be-encoded speech frame feature, and determine a negative to-be-encoded speech frame criticality level based on the negative to-be-encoded speech frame feature.

Step 812: Calculate a to-be-encoded speech frame criticality level corresponding to the to-be-encoded speech frame based on the positive to-be-encoded speech frame criticality level and the negative to-be-encoded speech frame criticality level.

Figure 9:
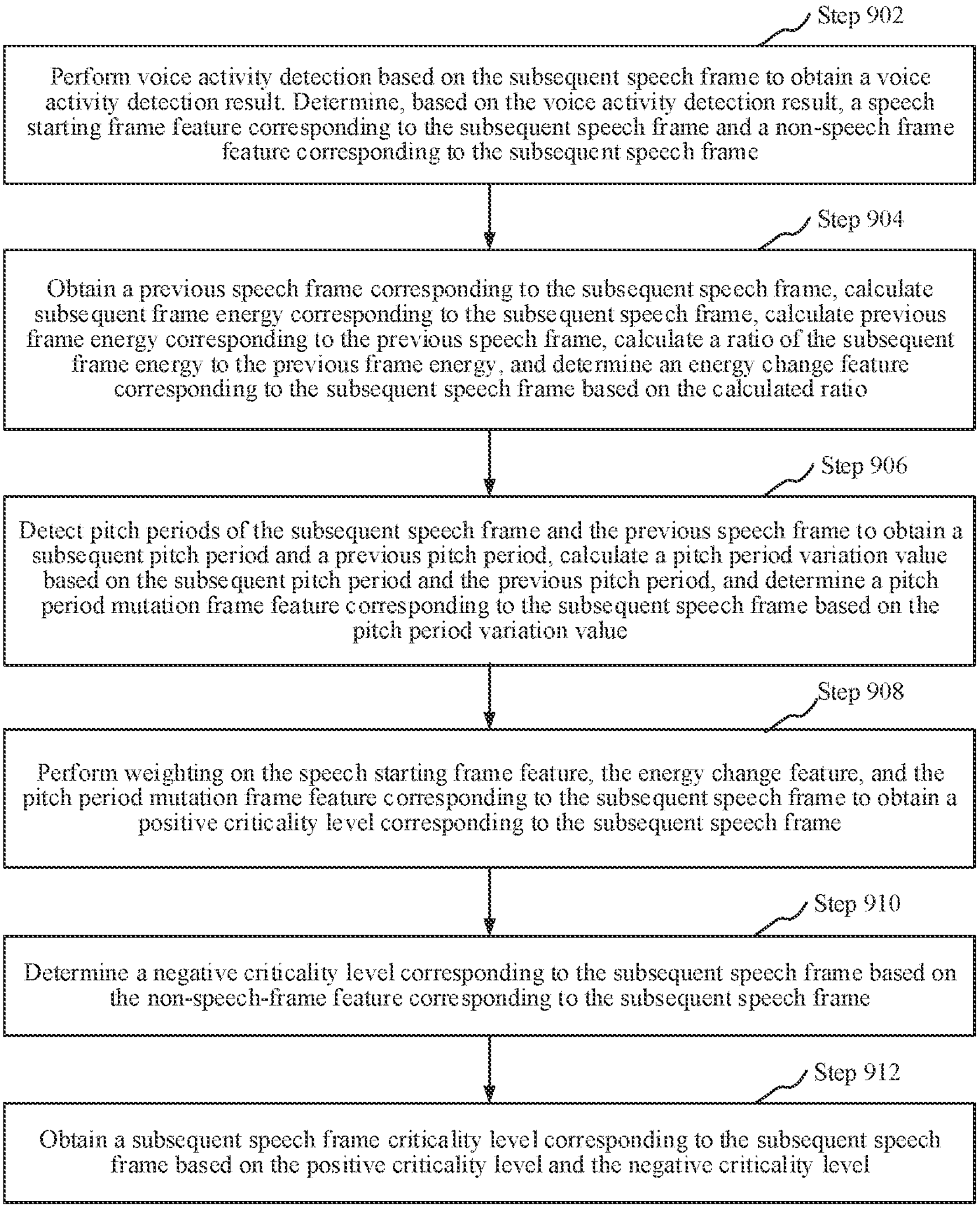
FIG. 9 is a schematic flowchart of calculating a subsequent speech frame criticality level according to the specific embodiment shown in FIG. 8.

As shown in FIG. 9, the obtaining a subsequent speech frame criticality level corresponding to the subsequent speech frame includes the following steps:

Step 902: Perform voice activity detection based on the subsequent speech frame to obtain a voice activity detection result. Determine, based on the voice activity detection result, a speech starting frame feature corresponding to the subsequent speech frame and a non-speech frame feature corresponding to the subsequent speech frame.

Step 904: Obtain a previous speech frame corresponding to the subsequent speech frame, calculate subsequent frame energy corresponding to the subsequent speech frame, calculate previous frame energy corresponding to the previous speech frame, calculate a ratio of the subsequent frame energy to the previous frame energy, and determine an energy change feature corresponding to the subsequent speech frame based on the calculated ratio.

Step 906: Detect pitch periods of the subsequent speech frame and the previous speech frame to obtain a subsequent pitch period and a previous pitch period, calculate a pitch period variation value based on the subsequent pitch period and the previous pitch period, and determine a pitch period modulation frame feature corresponding to the subsequent speech frame based on the pitch period variation value.

Step 908: Perform weighting on the speech starting frame feature, the energy change feature, and the pitch period modulation frame feature corresponding to the subsequent speech frame to obtain a positive criticality level corresponding to the subsequent speech frame.

Step 910: Determine a negative criticality level corresponding to the subsequent speech frame based on the non-speech-frame feature corresponding to the subsequent speech frame.

Figure 10:
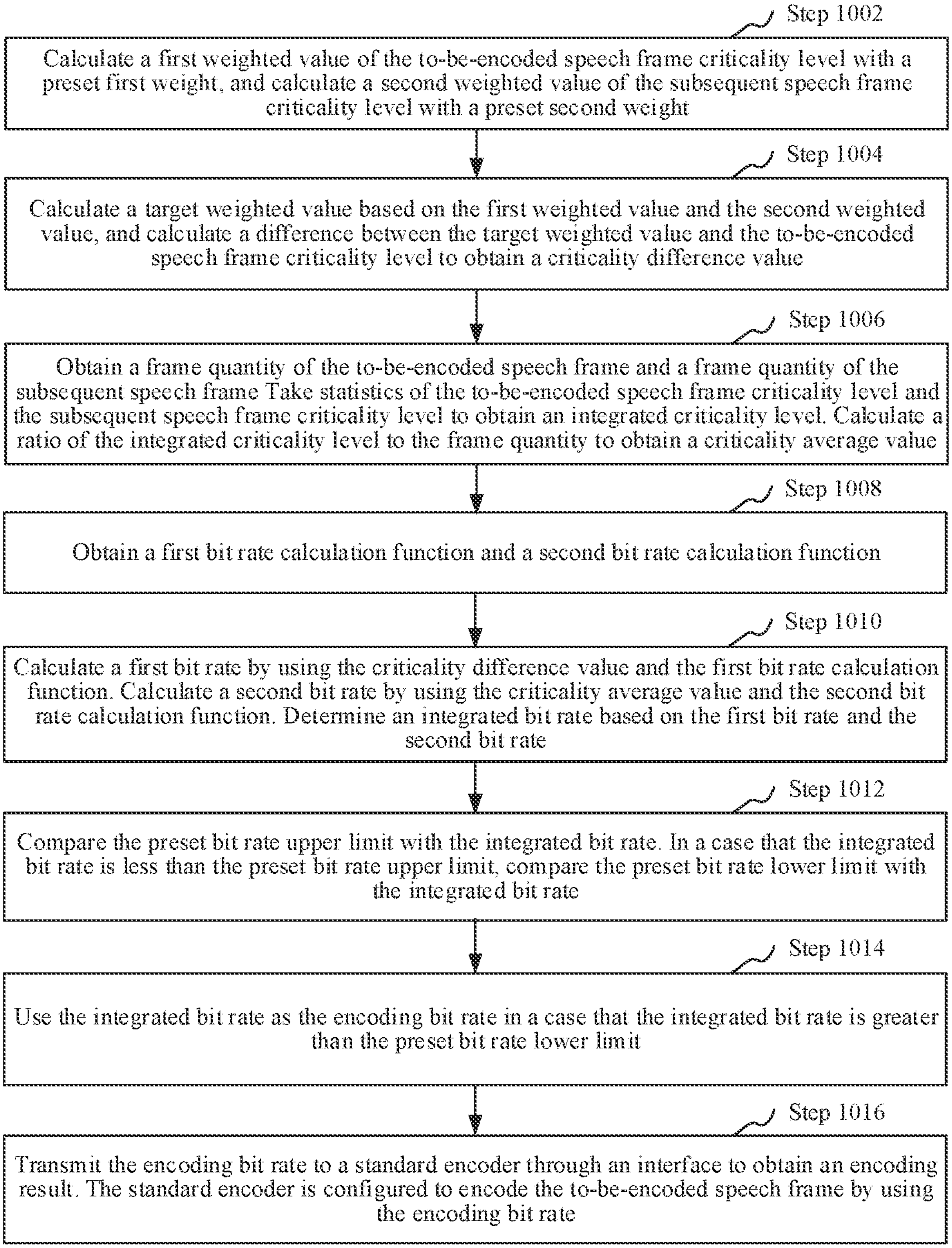
FIG. 10 is a schematic flowchart of obtaining an encoding result according to a specific embodiment shown in FIG. 8.

Step 912: Obtain a subsequent speech frame criticality level corresponding to the subsequent speech frame based on the positive criticality level and the negative criticality level. When obtaining the to-be-encoded speech frame criticality level corresponding to the to-be-encoded speech frame and the subsequent speech frame criticality level corresponding to the subsequent speech frame, as shown in FIG. 10, the calculating the encoding bit rate corresponding to the to-be-encoded speech frame includes the following steps:

Step 1002: Calculate a first weighted value of the to-be-encoded speech frame criticality level with a preset first weight, and calculate a second weighted value of the subsequent speech frame criticality level with a preset second weight.

Step 1004: Calculate a target weighted value based on the first weighted value and the second weighted value, and calculate a difference between the target weighted value and the to-be-encoded speech frame criticality level to obtain a criticality difference value.

Step 1006: Obtain a frame quantity of the to-be-encoded speech frame and a frame quantity of the subsequent speech frame. Take statistics of the to-be-encoded speech frame criticality level and the subsequent speech frame criticality level to obtain an integrated criticality level. Calculate a ratio of the integrated criticality level to the frame quantity to obtain a criticality average value.

Step 1008: Obtain a first bit rate calculation function and a second bit rate calculation function.

Step 1010: Calculate a first bit rate by using the criticality difference value and the first bit rate calculation function. Calculate a second bit rate by using the criticality average value and the second bit rate calculation function. Determine an integrated bit rate based on the first bit rate and the second bit rate.

Step 1012: Compare the preset bit rate upper limit with the integrated bit rate. When the integrated bit rate is less than the preset bit rate upper limit, compare the preset bit rate lower limit with the integrated bit rate.

Step 1014: Use the integrated bit rate as the encoding bit rate when the integrated bit rate is greater than the preset bit rate lower limit.

Step 1016: Transmit the encoding bit rate to a standard encoder through an interface to obtain an encoding result. The standard encoder is configured to encode the to-be-encoded speech frame by using the encoding bit rate. Finally, the obtained encoding result is saved.

Figure 11:
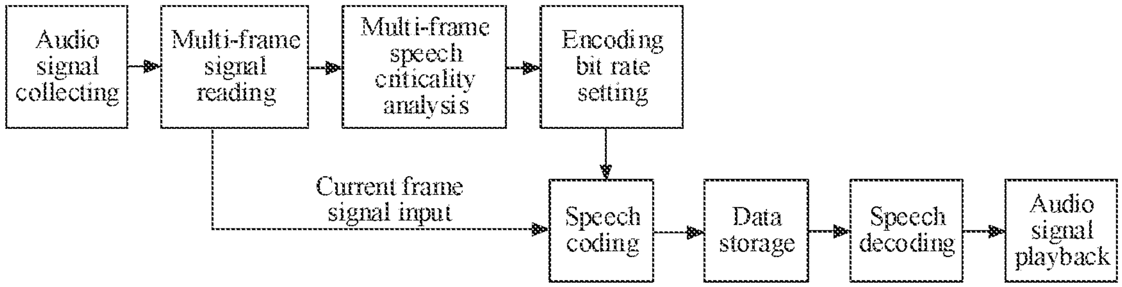
FIG. 11 is a schematic flowchart of audio broadcasting according to a specific embodiment.

This application further provides an application scenario in which the foregoing speech coding method is applied. Specifically, in this application scenario, the speech coding method is applied in the following way. FIG. 11 is a schematic flowchart of audio broadcasting. In this scenario, when a broadcaster broadcasts, a microphone collects an audio signal broadcasted by the broadcaster. In this case, a plurality of speech signal frames is read in the audio signal. The plurality of speech signal frames include a current to-be-encoded speech frame and 3 subsequent speech frames. In this case, multi-frame speech criticality analysis is performed. Specifically, an analysis method includes: extracting at least one to-be-encoded speech frame feature corresponding to the to-be-encoded speech frame, and obtaining a to-be-encoded speech frame criticality level corresponding to the to-be-encoded speech frame based on the to-be-encoded speech frame feature. Subsequent speech frame features corresponding to 3 subsequent speech frames are extracted respectively. A subsequent speech frame criticality level corresponding to each subsequent speech frame is obtained based on the subsequent speech frame feature. A criticality trend feature is obtained based on the to-be-encoded speech frame criticality level and the subsequent speech frame criticality level of each frame. An encoding bit rate corresponding to the to-be-encoded speech frame is determined by using the criticality trend feature. Subsequently, an encoding bit rate is set. To be specific, through an external interface, a bit rate in a standard encoder is reset to the encoding bit rate corresponding to the to-be-encoded speech frame. In this case, by using the encoding bit rate corresponding to the to-be-encoded speech frame, the standard encoder encodes the current to-be-encoded speech frame to obtain a bitstream, stores the bitstream, and, during playback, decodes the bitstream to obtain an audio signal. A speaker plays the audio signal, so that the broadcasted sound is clearer.

Figure 12:
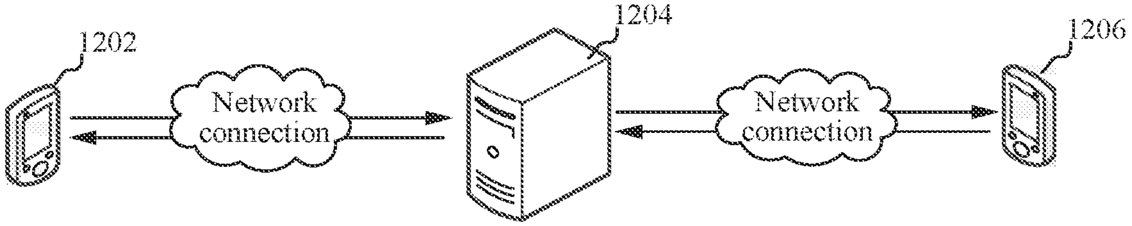
FIG. 12 is an application environment diagram of a speech coding method according to a specific embodiment.

This application further provides an application scenario in which the foregoing speech coding method is applied. Specifically, in this application scenario, the speech coding method is applied in the following way. FIG. 12 is a schematic diagram of an application scenario of speech communication, including a terminal 1202, a server 1204, and a terminal 1206. The terminal 1202 and the server 1204 are connected through a network. The server 1204 is connected to the terminal 1206 through the network. When a user A sends a speech message to a terminal 1206 of a user B through a communications application in the terminal 1202. The terminal 1202 collects a speech signal of the user A, obtains a to-be-encoded speech frame and a subsequent speech frame from the speech signal, extracts a to-be-encoded speech frame feature corresponding to the to-be-encoded speech frame, and obtains a to-be-encoded speech frame criticality level corresponding to the to-be-encoded speech frame based on the to-be-encoded speech frame feature. The terminal 1202 extracts a subsequent speech frame feature corresponding to the subsequent speech frame, and obtains a subsequent speech frame criticality level corresponding to the subsequent speech frame based on the subsequent speech frame feature. The terminal 1202 obtains a criticality trend feature based on the to-be-encoded speech frame criticality level and the subsequent speech frame criticality level, determines an encoding bit rate corresponding to the to-be-encoded speech frame by using the criticality trend feature, encodes the to-be-encoded speech frame at the encoding bit rate to obtain a bitstream, and sends the bitstream to the terminal 1206 through the server 1204. When the user B plays, through the communications application in the terminal 1206, the speech message sent by the user A, the communications application decodes the bitstream to obtain a corresponding speech signal A speaker plays the speech signal. Because the speech coding quality is enhanced, the speech message heard by the user B is clearer, and network bandwidth resources are saved.

This application further provides an application scenario in which the foregoing speech coding method is applied. Specifically, in this application scenario, the speech coding method is applied in the following way. A conference audio signal is collected by a microphone during conference recording. A to-be-encoded speech frame and 5 subsequent speech frames are determined among the conference audio signal. Subsequently, a to-be-encoded speech frame feature corresponding to the to-be-encoded speech frame is extracted. A to-be-encoded speech frame criticality level corresponding to the to-be-encoded speech frame is obtained based on the to-be-encoded speech frame feature. A subsequent speech frame feature corresponding to each subsequent speech frame is extracted. A subsequent speech frame criticality level corresponding to each subsequent speech frame is obtained based on the subsequent speech frame feature. A criticality trend feature is obtained based on the to-be-encoded speech frame criticality level and each subsequent speech frame criticality level. An encoding bit rate corresponding to the to-be-encoded speech frame is determined by using the criticality trend feature. The to-be-encoded speech frame is encoded at the encoding bit rate to obtain a bitstream. The bitstream is saved to a specified server address. The encoding bit rate, which is regulable, can reduce the overall bit rate, and therefore, saves storage resources of the server. When conference users or other users want to view the conference content subsequently, the users can obtain the saved code bitstream in the server address, decode the bitstream to obtain conference audio signals, and play the conference audio signals. In this way, the conference users or other users can hear the conference content, and use the content conveniently.

Understandably, although the steps in the flowcharts of FIG. 2 to FIG. 10 are sequentially displayed as indicated by arrows, the steps are not necessarily performed in the order indicated by the arrows. Unless otherwise expressly specified herein, the order of performing the steps is not strictly limited, and the steps may be performed in other order. Moreover, at least a part of the steps in FIG. 2 to FIG. 10 may include a plurality of substeps or stages. The substeps or stages are not necessarily performed at the same time, but may be performed at different times. The substeps or stages are not necessarily performed sequentially, but may take turns or alternate with other steps or at least a part of substeps or stages of other steps.

Figure 13:
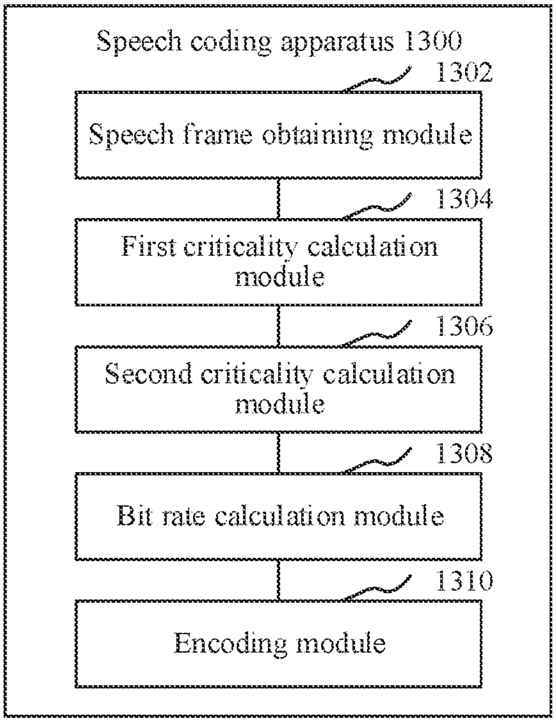
FIG. 13 is a structural block diagram of a speech coding apparatus according to an embodiment.

In an embodiment, as shown in FIG. 13, a speech coding apparatus 1300 is provided. The apparatus may adopt a software module or a hardware module or a combination thereof and may become a part of a computer device. The apparatus specifically includes: a speech frame obtaining module 1302, a first criticality calculation module 1304, a second criticality calculation module 1306, a bit rate calculation module 1308, and an encoding module 1310.

The speech frame obtaining module 1302 is configured to obtain a to-be-encoded speech frame and a subsequent speech frame corresponding to the to-be-encoded speech frame.

The first criticality calculation module 1304 is configured to extract at least one to-be-encoded speech frame feature corresponding to the to-be-encoded speech frame, and calculate a to-be-encoded speech frame criticality level corresponding to the to-be-encoded speech frame based on the to-be-encoded speech frame feature.

The second criticality calculation module 1306 is configured to extract a subsequent speech frame feature corresponding to the subsequent speech frame, and calculate a subsequent speech frame criticality level corresponding to the subsequent speech frame based on the subsequent speech frame feature.

The bit rate calculation module 1308 is configured to obtain a criticality trend feature based on the to-be-encoded speech frame criticality level and the subsequent speech frame criticality level, and determine, by using the criticality trend feature, an encoding bit rate corresponding to the to-be-encoded speech frame.

The encoding module 1310 is configured to encode the to-be-encoded speech frame based on the encoding bit rate to obtain an encoding result.

In an embodiment, the to-be-encoded speech frame feature and the subsequent speech frame feature include at least one of a speech starting frame feature or a non-speech frame feature. The speech coding apparatus 1300 further includes a first feature extraction module, configured to: obtain a to-be-extracted speech frame, where the to-be-extracted speech frame is the to-be-encoded speech frame or the subsequent speech frame; perform voice activity detection based on the to-be-extracted speech frame to obtain a voice activity detection result; determine, when a result of the voice activity detection is that the speech frame is a speech starting endpoint, at least one of (i) a speech starting frame feature corresponding to the to-be-extracted speech frame is a first target value, or (ii) a non-speech frame feature corresponding to the to-be-extracted speech frame is a second target value; and determine, when a result of the voice activity detection is that the speech frame is not a speech starting endpoint, at least one of (i) the speech starting frame feature corresponding to the to-be-extracted speech frame is the second target value, or (ii) the non-speech frame feature corresponding to the to-be-extracted speech frame is the first target value.

In an embodiment, the to-be-encoded speech frame feature and the subsequent speech frame feature include an energy change feature. The speech coding apparatus 1300 further includes a second feature extraction module, configured to: obtain a to-be-extracted speech frame, where the to-be-extracted speech frame is the to-be-encoded speech frame or the subsequent speech frame; obtain a previous speech frame corresponding to the to-be-extracted speech frame, calculate to-be-extracted frame energy corresponding to the to-be-extracted speech frame, and calculate previous frame energy corresponding to the previous speech frame, and calculate a ratio of the to-be-extracted frame energy to the previous frame energy, and determine an energy change feature corresponding to the to-be-extracted speech frame based on the calculated ratio.

In an embodiment, the speech coding apparatus 1300 further includes: a frame energy calculation module, configured to: perform data sampling based on the to-be-extracted speech frame to obtain a data value of each sample and a number of samples; and calculate a sum of squares of data values of all samples, and calculate a ratio of the sum of squares to the number of samples to obtain the to-be-extracted frame energy.

In an embodiment, the to-be-encoded speech frame feature and the subsequent speech frame feature include a pitch period modulation frame feature. The speech coding apparatus 1300 further includes a third feature extraction module, configured to: obtain a to-be-extracted speech frame, where the to-be-extracted speech frame is the to-be-encoded speech frame or the subsequent speech frame; obtain a previous speech frame corresponding to the to-be-extracted speech frame, and detect pitch periods of the to-be-extracted speech frame and the previous speech frame to obtain a to-be-extracted pitch period and a previous pitch period; and calculate a pitch period variation value based on the to-be-extracted pitch period and the previous pitch period, and determine a pitch period modulation frame feature corresponding to the to-be-extracted speech frame based on the pitch period variation value.

In an embodiment, the first criticality calculation module 1304 includes: a positive calculation unit, configured to determine a positive to-be-encoded speech frame feature among the at least one to-be-encoded speech frame feature, and perform weighting on the positive to-be-encoded speech frame feature to obtain a positive to-be-encoded speech frame criticality level, the positive to-be-encoded speech frame feature including at least one of a speech starting frame feature, an energy change feature, or a pitch period modulation frame feature; a negative calculation unit, configured to determine a negative to-be-encoded speech frame feature among the at least one to-be-encoded speech frame feature, and determine a negative to-be-encoded speech frame criticality level based on the negative to-be-encoded speech frame feature, the negative to-be-encoded speech frame feature including a non-speech frame feature; a criticality calculation unit, configured to calculate a to-be-encoded speech frame criticality level corresponding to the to-be-encoded speech frame based on the positive to-be-encoded speech frame criticality level and the negative to-be-encoded speech frame criticality level.

In an embodiment, the bit rate calculation module 1308 includes: a value calculation unit, configured to calculate a criticality difference value and a criticality average value based on the to-be-encoded speech frame criticality level and the subsequent speech frame criticality level; and a bit rate obtaining unit, configured to calculate the encoding bit rate corresponding to the to-be-encoded speech frame based on the criticality difference value and the criticality average value.

In an embodiment, the value calculation unit is further configured to calculate a first weighted value of the to-be-encoded speech frame criticality level with a preset first weight, and calculate a second weighted value of the subsequent speech frame criticality level with a preset second weight; and calculate a target weighted value based on the first weighted value and the second weighted value, and calculate a difference between the target weighted value and the to-be-encoded speech frame criticality level to obtain the criticality difference value.

In an embodiment, the value calculation unit is further configured to: obtain a frame quantity of the to-be-encoded speech frame and a frame quantity of the subsequent speech frame; and take statistics of the to-be-encoded speech frame criticality level and the subsequent speech frame criticality level to obtain an integrated criticality level, and calculate a ratio of the integrated criticality level to the frame quantity to obtain the criticality average value.

In an embodiment, the bit rate obtaining unit is further configured to: obtain a first bit rate calculation function and a second bit rate calculation function; calculate a first bit rate by using the criticality average value and the first bit rate calculation function, calculate a second bit rate by using the criticality difference value and the second bit rate calculation function, and determine an integrated bit rate based on the first bit rate and the second bit rate, where the first bit rate is proportional to the criticality average value, and the second bit rate is proportional to the criticality difference value; and obtain a preset bit rate upper limit and a preset bit rate lower limit, and determine the encoding bit rate based on the preset bit rate upper limit, the preset bit rate lower limit, and the integrated bit rate.

In an embodiment, the bit rate obtaining unit is further configured to: compare the preset bit rate upper limit with the integrated bit rate; compare the preset bit rate lower limit with the integrated bit rate when the integrated bit rate is less than the preset bit rate upper limit; and use the integrated bit rate as the encoding bit rate when the integrated bit rate is greater than the preset bit rate lower limit.

In an embodiment, the encoding module 1310 is further configured to transmit the encoding bit rate to a standard encoder through an interface to obtain an encoding result, where the standard encoder is configured to encode the to-be-encoded speech frame by using the encoding bit rate.

For a specific limitation on the speech coding apparatus, refer to the limitation on the speech coding method described above, details of which are omitted herein. The modules of the speech coding apparatus may be implemented entirely or partly by software, hardware, or a combination thereof. The modules may be built in a processor of a computer device in hardware form or independent of the processor, or may be stored in a memory of the computer device in software form, so as to be invoked by the processor to perform the corresponding operations.

In an embodiment, a computer device is provided. The computer device may be a terminal. An internal structure diagram of the computer device may be shown in FIG. 14. The computer device includes a processor, a memory, a communications interface, a display screen, an input apparatus, and a recording apparatus that are connected by a system bus. The processor of the computer device is configured to provide computing and control capabilities. The memory of the computer device includes a non-volatile storage medium, and an internal memory. The non-volatile storage medium stores an operating system and a computer-readable instruction. The internal memory provides an environment for running of the operating system and the computer-readable instruction in the non-volatile storage medium. The communications interface of the computer device is configured to communicate with an external terminal in a wired or wireless manner. The wireless communication may be implemented by WIFI, an operator network. NFC (Near Field Communication), or other technologies. When executed by a processor, the computer-readable instruction implements a speech coding method. The display screen of the computer device may be a liquid crystal display or an electronic ink display screen. The input apparatus of the computer device may be a touch layer that overlays the display screen, or may be a key, a trackball, or a touchpad disposed on the chassis of the computer device, or may be an external keyboard, touchpad or mouse or the like. The speech collecting apparatus of the computer device may be a microphone.

Figure 14:
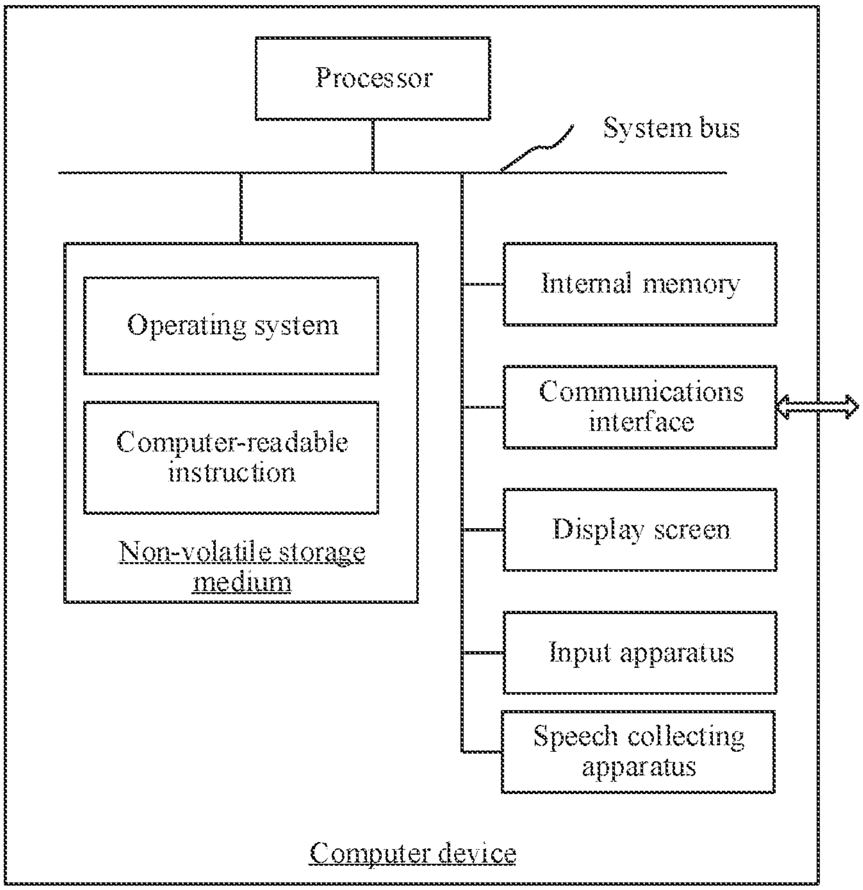
FIG. 14 is an internal structure diagram of a computer device according to an embodiment.

A person skilled in the art understands that the structure shown in FIG. 14 is a block diagram of just a part of the structure related to the solution of this application, and does not constitute any limitation on the computer device to which the solution of this application is applied. A specific computer device may include more or fewer components than those shown in the drawings, or may include a combination of some of the components, or may arrange the components in a different way.

In an embodiment, a computer device is further provided, including a memory and a processor. The memory stores a computer-readable instruction. When executed by the processor, the computer-readable instruction causes the processor to implement steps of the method embodiments described above.

In an embodiment, one or more non-volatile storage medium that stores a computer-readable instruction. When executed by one or more processors, the computer-readable instruction causes the one or more processors to implement steps of the method embodiments described above.

In an embodiment, a computer program product or a computer program is provided. The computer program product or the computer program includes a computer instruction. The computer instruction is stored in a computer-readable storage medium. The processor of the computer device reads the computer instruction from the computer-readable storage medium. The processor executes the computer instruction to cause the computer device to perform the steps of the method embodiments.

A person of ordinary skill in the art may understand that all or some of the processes of the methods in the foregoing embodiments may be implemented by a computer program instructing relevant hardware. The computer program may be stored in a nonvolatile computer-readable storage medium. When executed, the computer program can perform processes that include the foregoing method embodiments. Any reference to a memory, a storage, a database, or another medium used in the embodiments provided in this application may include at least one of a non-volatile memory or a volatile memory. The non-volatile memory may include a read-only memory (ROM), a magnetic tape, a floppy disk, a flash memory, an optical memory, or the like. The volatile memory may include a random access memory (RAM) or an external cache. Illustratively rather than restrictively, the RAM is in diverse forms, such as a static random access memory (Static Random Access Memory, SRAM) or a dynamic random access memory (Dynamic Random Access Memory, DRAM).

The technical features in the foregoing embodiments may be combined arbitrarily. For brevity, not all possible combinations of the technical features in the embodiments are described. However, to the extent that no conflict exists, all such combinations of the technical features are considered falling within the scope hereof.

The foregoing embodiments merely describe several implementations of this application. The description goes to details, but is in no way to be thereby understood as a limitation on the patent scope hereof. It is hereby noted that several variations and improvements, which may be made to the embodiments by a person of ordinary skill in the art without departing from the concept of this application, fall within the protection scope of this application. Therefore, the protection scope of this application is subject to the claims appended hereto.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs speech coding method. In practical application, the foregoing functions may be allocated to and completed by different functional modules according to requirements, that is, an inner structure of a device is divided into different functional modules to implement all or a part of the functions described above.

What is claimed is:

1. A speech coding method, executed by an electronic device, the method comprising:

obtaining a first to-be-encoded speech frame and a subsequent speech frame from an audio signal;

extracting a first speech frame feature corresponding to the first to-be-encoded speech frame, and calculating a first speech frame criticality level corresponding to the first to-be-encoded speech frame based on the first speech frame feature, wherein the first speech frame criticality level represents a level of contribution made by sound quality of the first speech frame to overall speech quality within a period that includes one or more speech frames before the first speech frame and one or more speech frames after the first speech frame;

extracting a second speech frame feature corresponding to the subsequent speech frame, and calculating a second speech frame criticality level corresponding to the subsequent speech frame based on the second speech frame feature, wherein the second speech frame criticality level represents a level of contribution made by sound quality of the second speech frame to the overall speech quality within a period that includes one or more speech frames before the second speech frame and one or more speech frames after the second speech frame;

obtaining a criticality trend feature based on the first speech frame criticality level and the second speech frame criticality level, and determining, using the criticality trend feature, an encoding bit rate corresponding to the first to-be-encoded speech frame, the encoding bit rate corresponding to each to-be-encoded speech frame being controlled adaptively based on criticality trend strength represented by the criticality trend feature; and encoding the first to-be-encoded speech frame based on the encoding bit rate to obtain an encoding result of the audio signal.

2. The method according to claim 1, wherein the first to-be-encoded speech frame feature and the second speech frame feature comprise at least one of a speech starting frame feature or a non-speech frame feature, and extracting the speech starting frame feature or the non-speech frame feature comprises:

obtaining a to-be-extracted speech frame, the to-be-extracted speech frame being at least one of the first to-be-encoded speech frame or the second speech frame;

performing voice activity detection on the to-be-extracted speech frame to obtain a voice activity detection result;

in accordance with a determination that at least one of (i) a speech starting frame feature of the to-be-extracted speech frame is a first target value, or (ii) a non-speech frame feature of the to-be-extracted speech frame is a second target value:

setting the voice activity detection result as a speech starting endpoint; and in accordance with a determination that (i) the speech starting frame feature of the to-be-extracted speech frame is the second target value, or (ii) the non-speech frame feature of the to-be-extracted speech frame is the first target value:

setting the voice activity detection result as not a speech starting endpoint.

3. The method according to claim 1, wherein the first to-be-encoded speech frame feature and the second speech frame feature comprise an energy change feature, and extracting the energy change feature comprises:

obtaining a to-be-extracted speech frame, the to-be-extracted speech frame being at least one of the to-be-encoded speech frame or the subsequent speech frame;

obtaining a previous speech frame corresponding to the to-be-extracted speech frame, calculating to-be-extracted frame energy of the to-be-extracted speech frame, and calculating previous frame energy of the previous speech frame; and calculating a ratio of the to-be-extracted frame energy to the previous frame energy, and determining an energy change feature corresponding to the to-be-extracted speech frame based on the calculated ratio.

4. The method according to claim 3, wherein calculating to-be-extracted frame energy corresponding to the to-be-extracted speech frame comprises:

performing data sampling based on the to-be-extracted speech frame to obtain a data value of each sample and a number of samples; and calculating a sum of squares of data values of all samples, and calculating a ratio of the sum of squares to the number of samples to obtain the to-be-extracted frame energy.

5. The method according to claim 1, wherein the first speech frame feature and the second speech frame feature comprise a pitch period modulation frame feature, and extracting the pitch period modulation frame feature comprises:

obtaining a to-be-extracted speech frame, the to-be-extracted speech frame being at least one of the first to-be-encoded speech frame or the second speech frame;

obtaining a previous speech frame corresponding to the to-be-extracted speech frame, and detecting pitch periods of the to-be-extracted speech frame and the previous speech frame to obtain a to-be-extracted pitch period and a previous pitch period; and calculating a pitch period variation value based on the to-be-extracted pitch period and the previous pitch period, and determining a pitch period modulation frame feature corresponding to the to-be-extracted speech frame based on the pitch period variation value.

6. The method according to claim 1, wherein obtaining the first speech frame criticality level corresponding to the first to-be-encoded speech frame based on the speech frame feature comprises:

determining a positive speech frame feature among the first speech frame feature, and performing weighting on the positive to-be-encoded speech frame feature to obtain a positive to-be-encoded speech frame criticality level, the positive to-be-encoded speech frame feature comprising at least one of a speech starting frame feature, an energy change feature, or a pitch period modulation frame feature;

determining a negative to-be-encoded speech frame feature among the first speech frame feature, and determining a negative to-be-encoded speech frame criticality level based on the negative to-be-encoded speech frame feature, wherein the negative to-be-encoded speech frame feature comprises a non-speech frame feature; and calculating a positive criticality level based on the positive to-be-encoded speech frame criticality level and a preset positive weight, calculating a negative criticality level based on the negative to-be-encoded speech frame criticality level and a preset negative weight, and obtaining the to-be-encoded speech frame criticality level corresponding to the to-be-encoded speech frame based on the positive criticality level and the negative criticality level.

7. The method according to claim 1, wherein obtaining the criticality trend feature and determining using the criticality trend feature comprise:

obtaining a target criticality trend feature based on a previous speech frame criticality level, the first speech frame criticality level, and the second speech frame criticality level; and determining, using the target criticality trend feature, the encoding bit rate corresponding to the first to-be-encoded speech frame.

8. The method according to claim 1, wherein obtaining the criticality trend feature and determining using the criticality trend feature comprise:

calculating a criticality difference value and a criticality average value based on the first speech frame criticality level and the second speech frame criticality level; and calculating the encoding bit rate corresponding to the first to-be-encoded speech frame based on the criticality difference value and the criticality average value.

9. The method according to claim 8, wherein calculating the criticality difference value based on the first speech frame criticality level and the second speech frame criticality level comprises:

calculating a first weighted value of the first speech frame criticality level with a preset first weight, and calculating a second weighted value of the second speech frame criticality level with a preset second weight; and calculating a target weighted value based on the first weighted value and the second weighted value, and calculating a difference between the target weighted value and the first speech frame criticality level to obtain the criticality difference value.

10. The method according to claim 8, wherein calculating the criticality average value based on the first speech frame criticality level and the second speech frame criticality level comprises:

obtaining a frame quantity of the first to-be-encoded speech frame and a frame quantity of the second speech frame; and obtain an integrated criticality level based on the first speech frame criticality level and the second speech frame criticality level, and calculating a ratio of the integrated criticality level to the frame quantity to obtain the criticality average value.

11. The method according to claim 8, wherein calculating the encoding bit rate corresponding to the first to-be-encoded speech frame based on the criticality difference value and the criticality average value comprises:

obtaining a first bit rate calculation function and a second bit rate calculation function;

calculating a first bit rate using the criticality average value and the first bit rate calculation function;

calculating a second bit rate using the criticality difference value and the second bit rate calculation function;

determining an integrated bit rate based on the first bit rate and the second bit rate, the first bit rate being proportional to the criticality average value, and the second bit rate being proportional to the criticality difference value;

obtaining a preset bit rate upper limit and a preset bit rate lower limit; and determining the encoding bit rate based on the preset bit rate upper limit, the preset bit rate lower limit, and the integrated bit rate.

12. The method according to claim 11, wherein determining the encoding bit rate based on the preset bit rate upper limit, the preset bit rate lower limit, and the integrated bit rate comprises:

comparing the preset bit rate upper limit with the integrated bit rate;

in accordance with a determination that the integrated bit rate is less than the preset bit rate upper limit:

comparing the preset bit rate lower limit with the integrated bit rate; and in accordance with a determination that the integrated bit rate is greater than the preset bit rate lower limit:

using the integrated bit rate as the encoding bit rate.

13. An electronic device, comprising:

one or more processors; and memory storing one or more programs, the one or more programs comprising instructions that, when executed by the one or more processors, cause the one or more processors to perform operations comprising:

obtaining a first to-be-encoded speech frame and a subsequent speech frame from an audio signal;

extracting a first speech frame feature corresponding to the first to-be-encoded speech frame, and calculating a first speech frame criticality level corresponding to the first to-be-encoded speech frame based on the first speech frame feature, wherein the first speech frame criticality level represents a level of contribution made by sound quality of the first speech frame to overall speech quality within a period that includes one or more speech frames before the first speech frame and one or more speech frames after the first speech frame;

extracting a second speech frame feature corresponding to the subsequent speech frame, and calculating a second speech frame criticality level corresponding to the subsequent speech frame based on the second speech frame feature, wherein the second speech frame criticality level represents a level of contribution made by sound quality of the second speech frame to the overall speech quality within a period that includes one or more speech frames before the second speech frame and one or more speech frames after the second speech frame;

obtaining a criticality trend feature based on the first speech frame criticality level and the second speech frame criticality level, and determining, using the criticality trend feature, an encoding bit rate corresponding to the first to-be-encoded speech frame, the encoding bit rate corresponding to each to-be-encoded speech frame being controlled adaptively based on criticality trend strength represented by the criticality trend feature; and encoding the first to-be-encoded speech frame based on the encoding bit rate to obtain an encoding result of the audio signal.

14. The electronic device according to claim 13, wherein the first to-be-encoded speech frame feature and the second speech frame feature comprise at least one of a speech starting frame feature or a non-speech frame feature, and extracting the speech starting frame feature or the non-speech frame feature comprises:

obtaining a to-be-extracted speech frame, the to-be-extracted speech frame being at least one of the first to-be-encoded speech frame or the second speech frame;

performing voice activity detection on the to-be-extracted speech frame to obtain a voice activity detection result;

in accordance with a determination that at least one of (i) a speech starting frame feature of the to-be-extracted speech frame is a first target value, or (ii) a non-speech frame feature of the to-be-extracted speech frame is a second target value:

setting the voice activity detection result as a speech starting endpoint; and in accordance with a determination that (i) the speech starting frame feature of the to-be-extracted speech frame is the second target value, or (ii) the non-speech frame feature of the to-be-extracted speech frame is the first target value:

setting the voice activity detection result as not a speech starting endpoint.

15. The electronic device according to claim 13, wherein the first to-be-encoded speech frame feature and the second speech frame feature comprise an energy change feature, and extracting the energy change feature comprises:

obtaining a to-be-extracted speech frame, the to-be-extracted speech frame being at least one of the to-be-encoded speech frame or the subsequent speech frame;

obtaining a previous speech frame corresponding to the to-be-extracted speech frame, calculating to-be-extracted frame energy of the to-be-extracted speech frame, and calculating previous frame energy of the previous speech frame; and calculating a ratio of the to-be-extracted frame energy to the previous frame energy, and determining an energy change feature corresponding to the to-be-extracted speech frame based on the calculated ratio.

16. The electronic device according to claim 15, wherein calculating to-be-extracted frame energy corresponding to the to-be-extracted speech frame comprises:

performing data sampling based on the to-be-extracted speech frame to obtain a data value of each sample and a number of samples; and calculating a sum of squares of data values of all samples, and calculating a ratio of the sum of squares to the number of samples to obtain the to-be-extracted frame energy.

17. The electronic device according to claim 13, wherein the first speech frame feature and the second speech frame feature comprise a pitch period modulation frame feature, and extracting the pitch period modulation frame feature comprises:

obtaining a to-be-extracted speech frame, the to-be-extracted speech frame being at least one of the first to-be-encoded speech frame or the second speech frame;

obtaining a previous speech frame corresponding to the to-be-extracted speech frame, and detecting pitch periods of the to-be-extracted speech frame and the previous speech frame to obtain a to-be-extracted pitch period and a previous pitch period; and calculating a pitch period variation value based on the to-be-extracted pitch period and the previous pitch period, and determining a pitch period modulation frame feature corresponding to the to-be-extracted speech frame based on the pitch period variation value.

18. The electronic device according to claim 13, wherein obtaining the first speech frame criticality level corresponding to the first to-be-encoded speech frame based on the speech frame feature comprises:

determining a positive speech frame feature among the first speech frame feature, and performing weighting on the positive to-be-encoded speech frame feature to obtain a positive to-be-encoded speech frame criticality level, the positive to-be-encoded speech frame feature comprising at least one of a speech starting frame feature, an energy change feature, or a pitch period modulation frame feature;

determining a negative to-be-encoded speech frame feature among the first speech frame feature, and determining a negative to-be-encoded speech frame criticality level based on the negative to-be-encoded speech frame feature, wherein the negative to-be-encoded speech frame feature comprises a non-speech frame feature; and calculating a positive criticality level based on the positive to-be-encoded speech frame criticality level and a preset positive weight, calculating a negative criticality level based on the negative to-be-encoded speech frame criticality level and a preset negative weight, and obtaining the to-be-encoded speech frame criticality level corresponding to the to-be-encoded speech frame based on the positive criticality level and the negative criticality level.

19. A non-transitory computer-readable storage medium, storing a computer program, the computer program, when executed by one or more processors of an electronic device, cause the one or more processors to perform operations comprising:

obtaining a first to-be-encoded speech frame and a subsequent speech frame from an audio signal;

extracting a first speech frame feature corresponding to the first to-be-encoded speech frame, and calculating a first speech frame criticality level corresponding to the first to-be-encoded speech frame based on the first speech frame feature, wherein the first speech frame criticality level represents a level of contribution made by sound quality of the first speech frame to overall speech quality within a period that includes one or more speech frames before the first speech frame and one or more speech frames after the first speech frame;

extracting a second speech frame feature corresponding to the subsequent speech frame, and calculating a second speech frame criticality level corresponding to the subsequent speech frame based on the second speech frame feature, wherein the second speech frame criticality level represents a level of contribution made by sound quality of the second speech frame to the overall speech quality within a period that includes one or more speech frames before the second speech frame and one or more speech frames after the second speech frame;

obtaining a criticality trend feature based on the first speech frame criticality level and the second speech frame criticality level, and determining, using the criticality trend feature, an encoding bit rate corresponding to the first to-be-encoded speech frame, the encoding bit rate corresponding to each to-be-encoded speech frame being controlled adaptively based on criticality trend strength represented by the criticality trend feature; and encoding the first to-be-encoded speech frame based on the encoding bit rate to obtain an encoding result of the audio signal.

20. The non-transitory computer-readable storage medium according to claim 19, wherein the first to-be-encoded speech frame feature and the second speech frame feature comprise at least one of a speech starting frame feature or a non-speech frame feature, and extracting the speech starting frame feature or the non-speech frame feature comprises:

obtaining a to-be-extracted speech frame, the to-be-extracted speech frame being at least one of the first to-be-encoded speech frame or the second speech frame;

performing voice activity detection on the to-be-extracted speech frame to obtain a voice activity detection result;

in accordance with a determination that at least one of (i) a speech starting frame feature of the to-be-extracted speech frame is a first target value, or (ii) a non-speech frame feature of the to-be-extracted speech frame is a second target value:

setting the voice activity detection result as a speech starting endpoint; and in accordance with a determination that (i) the speech starting frame feature of the to-be-extracted speech frame is the second target value, or (ii) the non-speech frame feature of the to-be-extracted speech frame is the first target value:

setting the voice activity detection result as not a speech starting endpoint.

* * * * *